(12) United States Patent
Fujita et al.

(10) Patent No.: US 10,453,214 B2
(45) Date of Patent: Oct. 22, 2019

(54) IMAGE CAPTURING DEVICE AND METHOD, PROGRAM, AND RECORD MEDIUM TO PERFORM EXPOSURE CONTROL BASED ON THE BRIGHTNESS IN AN ATTENTION AREA CORRESPONDING TO A DETECTED OBJECT

(71) Applicant: MITSUBISHI ELECTRIC CORPORATION, Tokyo (JP)

(72) Inventors: Takeo Fujita, Tokyo (JP); Koichi Yamashita, Tokyo (JP); Narihiro Matoba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 47 days.

(21) Appl. No.: 15/539,233

(22) PCT Filed: Nov. 12, 2015

(86) PCT No.: PCT/JP2015/081838
§ 371 (c)(1),
(2) Date: Jun. 23, 2017

(87) PCT Pub. No.: WO2016/117213
PCT Pub. Date: Jul. 28, 2016

(65) Prior Publication Data
US 2018/0012374 A1    Jan. 11, 2018

(30) Foreign Application Priority Data
Jan. 22, 2015  (JP) .................................. 2015-010132

(51) Int. Cl.
*H04N 5/225*  (2006.01)
*G06T 7/73*  (2017.01)
(Continued)

(52) U.S. Cl.
CPC ................ *G06T 7/73* (2017.01); *G03B 7/091* (2013.01); *G06T 7/80* (2017.01); *H04N 5/2257* (2013.01);
(Continued)

(58) Field of Classification Search
CPC ... G06T 7/73; G06T 7/80; G06T 2207/30256; G06T 2207/20021; G06T 2207/20208;
(Continued)

(56) References Cited

U.S. PATENT DOCUMENTS

| 6,590,521 B1 | 7/2003 | Saka et al. | |
| 2007/0073484 A1 | 3/2007 | Horibe | |
| 2008/0055412 A1* | 3/2008 | Tanaka | G08G 1/04 348/159 |
| 2008/0309517 A1* | 12/2008 | Saito | B60R 1/00 340/937 |

(Continued)

FOREIGN PATENT DOCUMENTS

| JP | 62-110369 A | 5/1987 |
| JP | 7-125567 A | 5/1995 |

(Continued)

*Primary Examiner* — Albert H Cutler
(74) *Attorney, Agent, or Firm* — Birch, Stewart, Kolasch & Birch, LLP

(57) ABSTRACT

An object having a high attention degree is selected from objects detected by a detection means, brightness of a captured image is calculated by using an attention region corresponding to the selected object as a detection frame, and exposure control is performed based on the calculated brightness. The attention degree is evaluated higher with the decrease in the distance. Alternatively, the attention degree is evaluated higher as the direction becomes closer to the traveling direction. The attention region is made larger with the decrease in the distance to the object. It is also possible to judge the type of the object and determine the size of the attention region based on the result of the judgment. A subject to be paid attention to is made clearly visible.

11 Claims, 20 Drawing Sheets

(51) Int. Cl.
*G06T 7/80* (2017.01)
*H04N 5/235* (2006.01)
*G03B 7/091* (2006.01)
*G03B 15/03* (2006.01)

(52) U.S. Cl.
CPC ........... *H04N 5/235* (2013.01); *H04N 5/2351* (2013.01); *H04N 5/2353* (2013.01); *G03B 15/03* (2013.01); *G06T 2207/10016* (2013.01); *G06T 2207/20021* (2013.01); *G06T 2207/20208* (2013.01); *G06T 2207/30236* (2013.01); *G06T 2207/30256* (2013.01); *G06T 2207/30261* (2013.01)

(58) Field of Classification Search
CPC . G06T 2207/10016; G06T 2207/30261; G06T 2207/30236; H04N 5/2257; H04N 5/2353; H04N 5/2351; H04N 5/235; H04N 5/2352; H04N 5/243; G03B 7/091; G03B 15/03
USPC .................................................. 348/362, 364
See application file for complete search history.

(56) References Cited

U.S. PATENT DOCUMENTS

| | | | | |
|---|---|---|---|---|
| 2009/0051794 | A1* | 2/2009 | Ando | G06T 5/009 348/274 |
| 2015/0243017 | A1* | 8/2015 | Fujimoto | G01S 17/936 348/142 |
| 2017/0085771 | A1* | 3/2017 | Schwager | G01S 13/867 |
| 2017/0098132 | A1* | 4/2017 | Yokota | G06T 7/285 |

FOREIGN PATENT DOCUMENTS

| | | |
|---|---|---|
| JP | 2001-134769 A | 5/2001 |
| JP | 2001-183462 A | 7/2001 |
| JP | 2005-339176 A | 12/2005 |
| JP | 2006-175936 A | 7/2006 |
| JP | 2007-96510 A | 4/2007 |
| JP | 2008-70999 A | 3/2008 |
| JP | 2009-134455 A | 6/2009 |
| JP | 2010-127717 A | 6/2010 |
| JP | 2014-135611 A | 7/2014 |
| JP | 2014-135612 A | 7/2014 |

\* cited by examiner

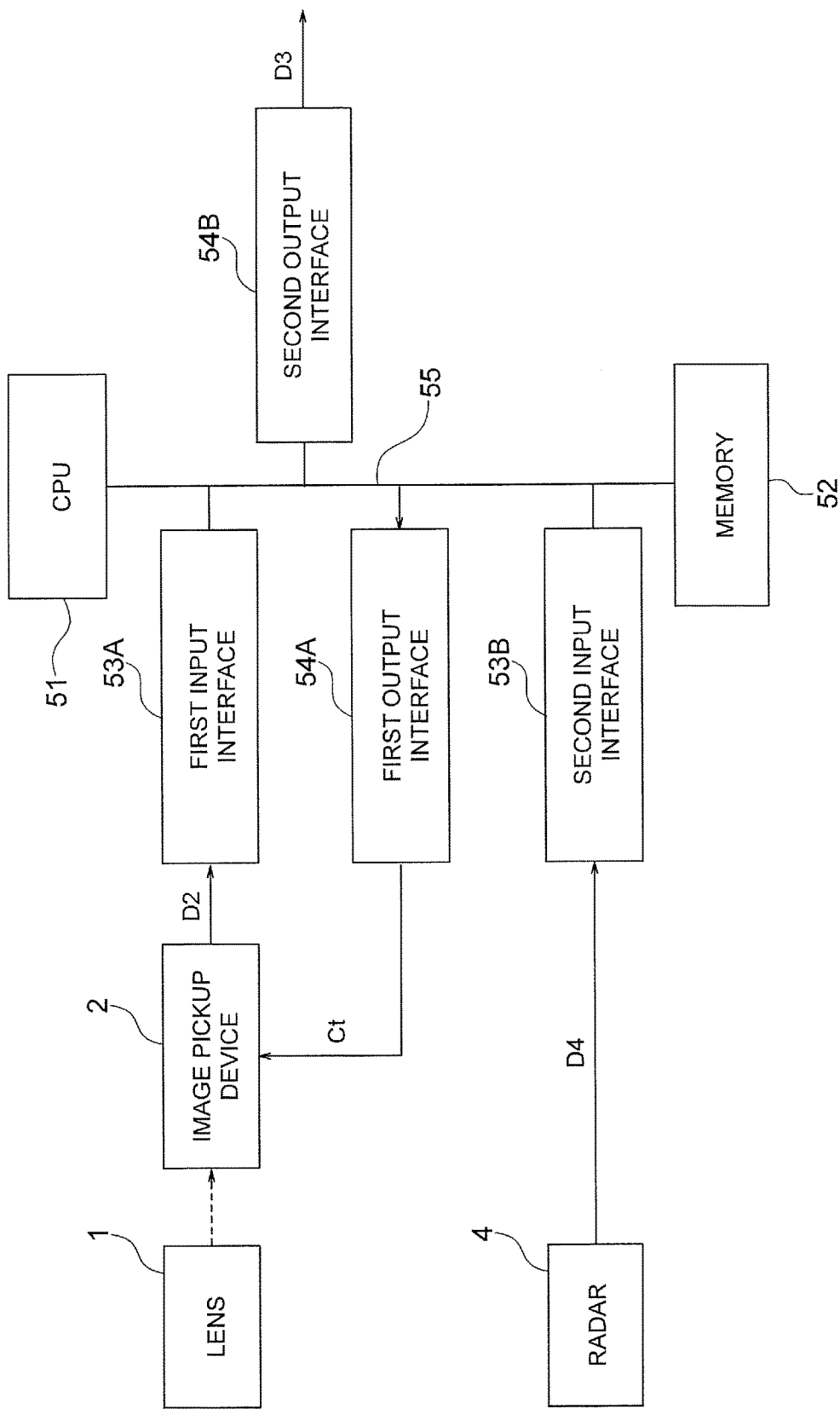

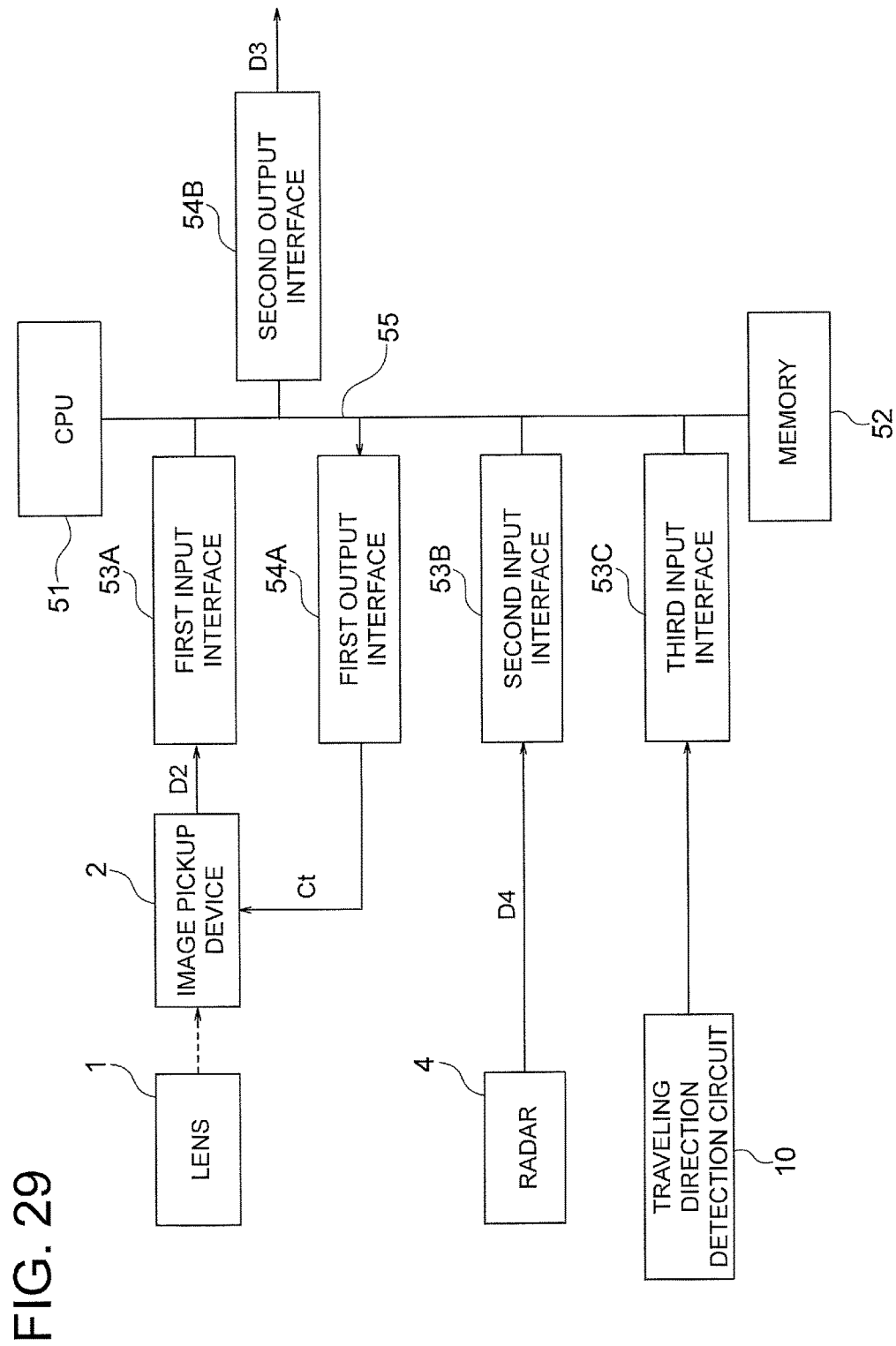

IMAGE CAPTURING DEVICE AND METHOD, PROGRAM, AND RECORD MEDIUM TO PERFORM EXPOSURE CONTROL BASED ON THE BRIGHTNESS IN AN ATTENTION AREA CORRESPONDING TO A DETECTED OBJECT

TECHNICAL FIELD

The present invention relates to an image capturing device and method. The present invention relates also to a program for causing a computer to execute a process in the image capturing device or method, and a record medium storing the program.

BACKGROUND ART

There has been known a conventional image capturing device that performs arithmetic processing on the level of an imaging signal in a central part of an imaging screen and the level of the imaging signal in a peripheral part of the imaging screen, judges whether or not an image is in a state of including a light source or the like in its peripheral part, and makes a correction so that the central part of the image has an appropriate signal level by continuously controlling the gain of a gain control unit depending on the state (see Patent Reference 1, for example).

PRIOR ART REFERENCES

Patent References

Patent Reference 1: Japanese Patent Application Publication No. 62-110369 (Page 2, Paragraph 8-Paragraph 9)

SUMMARY OF THE INVENTION

Problems to be Solved by the Invention

Since the aforementioned conventional image capturing device performs backlight compensation by judging whether or not the image is in the state of including a light source or the like in the peripheral part, when a subject to be paid attention to is not at the center of the screen, the device performs exposure control while being incapable of detecting the backlight state of the attention subject. Accordingly, there is a problem in that the attention subject can become invisible due to blocked up shadows or blown out highlights. Further, there is also a problem in that the recognition rate of the attention subject is low when the recognition is carried out by using the captured image.

An object of the present invention, which has been made to resolve the above-described problems, is to restrain the occurrence of the blocked up shadows or blown out highlights to the attention subject and thereby make the attention subject clearly visible.

Means for Solving the Problems

An image capturing device according to the present invention includes:
an image capturing means that captures an image of a subject situated in an imaging field angle range and thereby generates a captured image;
a detection means that detects an object existing in a detection range at least partially overlapping the imaging field angle range and outputs information representing a direction of the object and information representing distance to the object;
an attention object selection means that selects one or more objects based on the information representing the direction of the object and the information representing the distance outputted from the detection means and outputs information representing position of the selected object in the captured image and information representing the distance to the selected object;
an attention region specification means that specifies a region in the captured image including the selected object as an attention region based on the information representing the position of the selected object and the information representing the distance to the selected object outputted from the attention object selection means;
a brightness calculation means that calculates brightness of the captured image in the attention region specified by the attention region specification means; and
an exposure control means that performs exposure control on the image capturing means based on the brightness calculated by the brightness calculation means.

Effect of the Invention

According to the present invention, there is an effect that the occurrence of the blocked up shadows or blown out highlights to image parts corresponding to the selected object is restrained, and accordingly, the selected object is made clearly visible.

BRIEF DESCRIPTION OF THE DRAWINGS

FIG. 28 is a block diagram showing a computer system forming the image capturing device of the first, third, fifth or sixth embodiment.

FIG. 29 is a block diagram showing a computer system forming the image capturing device of the second or fourth embodiment.

MODE FOR CARRYING OUT THE INVENTION

First Embodiment

Figure 1:
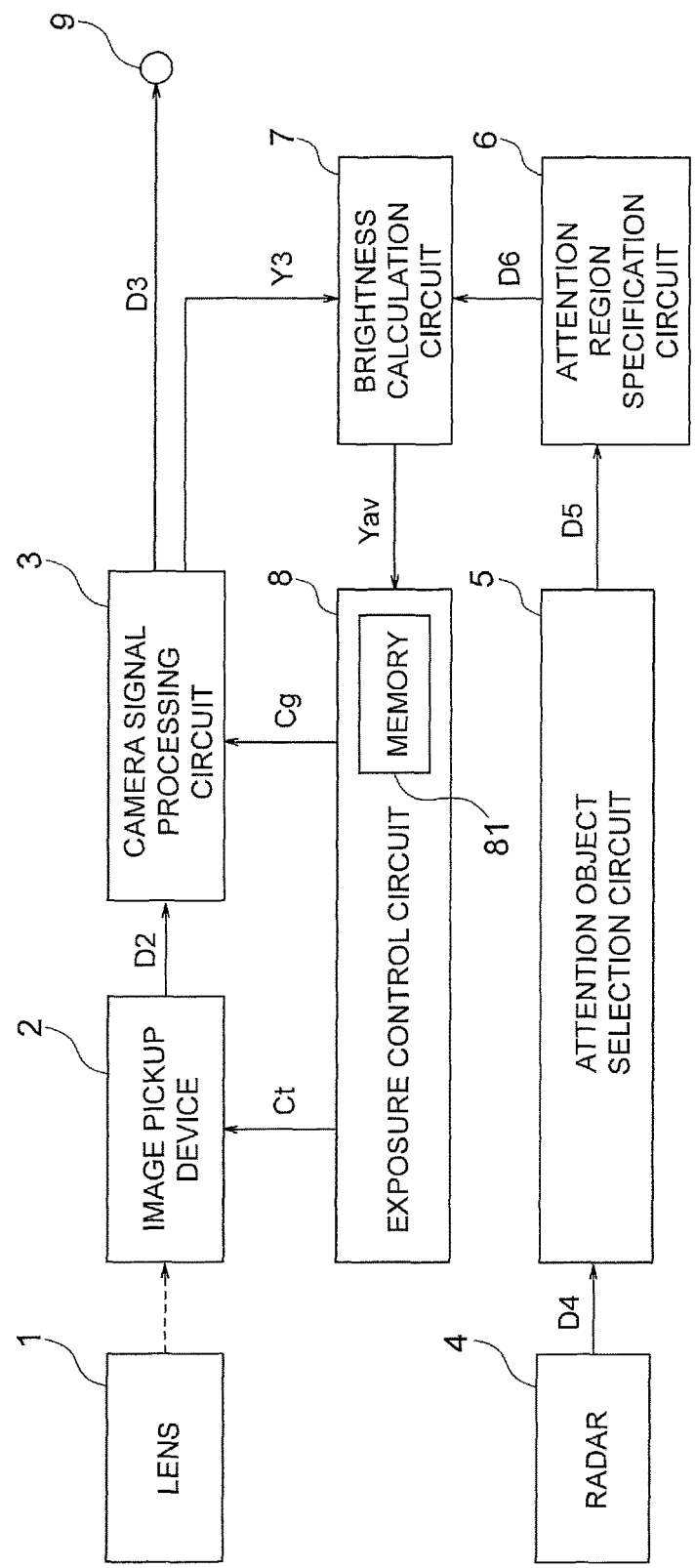
FIG. 1 is a block diagram showing a configuration of an image capturing device according to a first embodiment of the present invention.

FIG. 1 is a block diagram showing a configuration of an image capturing device according to a first embodiment of the present invention.

The image capturing device shown in the figure is an image capturing device to be mounted on a vehicle, including a lens 1, an image pickup device 2, a camera signal processing circuit 3, a radar 4, an attention object selection circuit 5, an attention region specification circuit 6, a brightness calculation circuit 7 and an exposure control circuit 8.

The lens 1 guides light incident from a subject situated in an imaging field angle range onto an imaging surface of the image pickup device 2 and thereby forms a subject image on the imaging surface.

The image pickup device 2 photoelectrically converts the subject image formed on the imaging surface and thereby generates an imaging signal representing the captured image. The imaging signal D2 generated by the image pickup device 2 is supplied to the camera signal processing circuit 3.

The following explanation will be given assuming a case where the image pickup device 2 captures video and outputs the imaging signal every frame period.

The image pickup device 2 is provided so as to capture images of the scene in front of the vehicle body of the vehicle on which the image capturing device is mounted (host vehicle), and the direction of an optical axis of the lens 1 is assumed to coincide with the forward direction of the vehicle body of the host vehicle.

The camera signal processing circuit 3 performs a color synchronization process, a signal amplification process, a gradation correction process, a noise reduction process, a contour correction process, a white balance adjustment process and a color correction process on the captured image of each frame outputted from the image pickup device 2, and outputs a time series of images obtained as the result of these processes (captured images after undergoing the signal processing) as an image signal D3. The image signal D3 is outputted from an output terminal 9.

The image signal D3 outputted is used for object recognition in a driving support process, for example.

The camera signal processing circuit 3 also outputs a luminance signal Y3 representing the luminance of each pixel of the captured image of each frame represented by the image signal D3. The luminance signal Y3 is supplied to the brightness calculation circuit 7.

In the aforementioned color synchronization process, color components missing at each pixel position are interpolated. In cases of pixel arrangement of the RGB Bayer type, pixel data of only one of the R pixel, the G pixel and the B pixel exists at each pixel position, and thus pixel data of the colors missing at each pixel position are interpolated by using pixel data of the same colors of vicinal pixels. This makes it possible to generate a complete image signal including pixel data of all the colors R, G and B for each pixel position.

In the aforementioned signal amplification process, the signal is amplified based on the result of detection of image brightness by the exposure control circuit 8 which will be explained later.

In the aforementioned gradation correction process, gradation correction is made by referring to a table to achieve a gradation characteristic according to a gamma characteristic, for example.

In the aforementioned noise reduction process, noise is reduced by performing at least one of a spatial smoothing process and a temporal smoothing process, for example.

In the aforementioned contour correction process, correction is made by enhancing contours diminished by the smoothing process and the like by applying a high-pass filter, for example.

In the aforementioned white balance adjustment process, the detection is performed on an R signal and a B signal (or an R-Y signal and a B-Y signal), for example, their average values are obtained, magnitudes of the average values are compared with each other, and gains are adjusted so that the R signal and the B signal (or the R-Y signal and the B-Y signal) are white balanced, for example.

In the aforementioned color correction process, the hue and the saturation are corrected by performing a matrix operation on the R signal, the G signal and the B signal.

The radar 4 as a detection means detects the positions of one or more objects existing in a detection range. The following explanation will be given assuming that the detection range of the radar 4 is identical with the imaging field angle range of the image pickup device 2.

Figure 2:
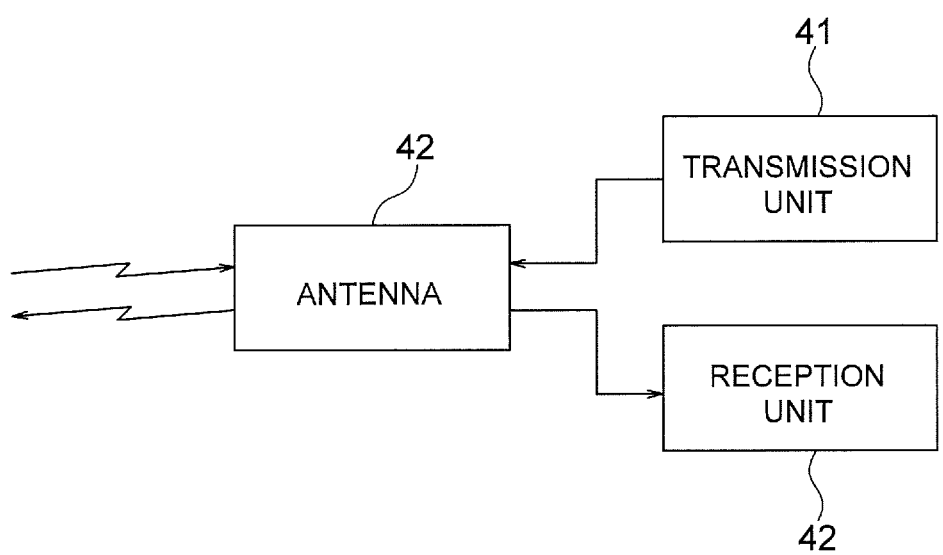
FIG. 2 is a block diagram showing a schematic configuration of a radar shown in FIG. 1.

As shown in FIG. 2, the radar 4 includes a transmission unit 41 for generating a transmission signal, an antenna 42 of high directivity for transmitting a transmission radio wave corresponding to the transmission signal in a particular direction and receiving a reflected radio wave from each of the objects, and a reception unit 43 for extracting reflected waves from the radio waves received by the antenna 42, and thereby measures the direction and the distance of each object in the detection range based on the transmission wave and the reflected waves.

The radar 4 outputs information D4a representing the measured direction (direction information D4a) and information D4b representing the measured distance (distance information D4b) as position information D4 on each object.

The direction represented by the direction information D4a is associated with a position in the captured image in the image pickup device 2. The position in the captured image is represented by a horizontal direction position and a vertical direction position in the captured image, for example.

It is assumed in the following explanation that the object detection by the radar 4 is performed in sync with (i.e., at the same cycles as) and with the same timing as the image capturing by the image pickup device 2.

The position information D4 is supplied to the attention object selection circuit 5.

The attention object selection circuit 5 selects an attention object based on the position information D4 on each object supplied from the radar 4. In the selection of the attention object, an attention degree of each object is evaluated and an object is selected based on the result of the evaluation. For example, an object having the highest attention degree is determined and the determined object is selected.

The attention object selection circuit 5 supplies information D5 representing the position of the selected object to the attention region specification circuit 6.

The information D5 representing the position of the selected object includes information D5a representing the position of the selected object in the captured image and information D5b representing the distance from the host vehicle to the object.

As mentioned earlier, the direction represented by the direction information D4a included in the position information D4 outputted from the radar 4 is associated with a position in the captured image. Therefore, a corresponding position in the captured image can be determined from the direction information D4a on each object outputted from the radar 4.

The attention object selection circuit 5 also extracts the information D5b representing the distance to the selected object from the distance information D4b on each object outputted from the radar 4.

The attention region specification circuit 6 specifies an attention region in the captured image based on the position of the object represented by the information D5 outputted from the attention object selection circuit 5, that is, the position of the object selected by the attention object selection circuit 5, and outputs information D6 representing the specified region (attention region information D6). The attention region information D6 is supplied to the brightness calculation circuit 7.

The brightness calculation circuit 7 performs the detection on the luminance signal Y3 outputted from the camera signal processing circuit 3 based on the information D6 representing the attention region outputted from the attention region specification circuit 6 and by using the attention region as a detection frame. For example, the brightness calculation circuit 7 calculates an average value Yav of luminance values of pixels included in the detection frame (luminance average value) Yav based on the luminance signal Y3 regarding the pixels included in the detection frame, and supplies the result of the calculation to the exposure control circuit 8 as information representing brightness. The luminance average value obtained as above is used as a brightness index value.

The exposure control circuit 8 compares the luminance average value Yav calculated by the brightness calculation circuit 7 with a luminance target value Yrf and performs exposure control based on the result of the comparison.

The exposure control is performed by controlling parameters of exposure conditions, that is, by controlling an exposure time Te for the image pickup device 2 and controlling a signal amplification gain Gs for the camera signal processing circuit 3. The exposure control circuit 8 supplies a control signal Ct for controlling the exposure time Te to the image pickup device 2 while supplying a control signal Cg for controlling the signal amplification gain Gs to the camera signal processing circuit 3.

The exposure control circuit 8 includes a memory 81. The memory 81 stores the value (parameter) of the exposure time Te to be used for the image capturing by the image pickup device 2 and the value (parameter) of the signal amplification gain Gs to be used for the signal amplification by the camera signal processing circuit 3.

When the luminance average value Yav is inputted from the brightness calculation circuit 7, the exposure control circuit 8 makes the adjustment of the exposure time Te and the signal amplification gain Gs.

For example, when the luminance average value Yav is greater than the luminance target value Yrf, adjustment for decreasing the exposure time or adjustment for decreasing the signal amplification gain is made.

Conversely, when the luminance average value Yav is less than the luminance target value Yrf, adjustment for increasing the exposure time or adjustment for increasing the signal amplification gain is made.

Which of the exposure time or the signal amplification gain should be changed is determined in such a manner that the noise becomes lower. For example, when the subject gradually becomes darker, the exposure time is first set long, and after the exposure time reaches the maximum, the signal amplification gain is increased. The maximum value of the exposure time is one frame cycle or a time as a tolerance limit of the motion blur. The length of time as the tolerance limit of the motion blur becomes shorter as the motion of the subject becomes quicker.

Incidentally, it is also possible to carry out the exposure control by controlling the aperture of the lens 1.

When the exposure time Te or the signal amplification gain Gs has been adjusted, the value of the exposure time or the signal amplification gain stored in the memory 81 is overwritten (updated) with the adjusted value.

The adjusted value of the exposure time Te or the signal amplification gain Gs is supplied to the image pickup device 2 and the camera signal processing circuit 3 and used for the exposure control in the image capturing from the next frame period.

By the control of the exposure time of the image pickup device 2 and the control of the signal amplification gain of the camera signal processing circuit 3 performed by the exposure control circuit 8, the images represented by the image signal outputted from the camera signal processing circuit 3 are controlled so that the object in the attention region is visible with appropriate brightness.

A case where the image capturing device of this embodiment is employed for capturing images of an object in front of a vehicle and thereby recognizing the object will be explained below. In this case, the image capturing device is mounted on the vehicle and captures images of the scene in front of the vehicle.

Figure 3:
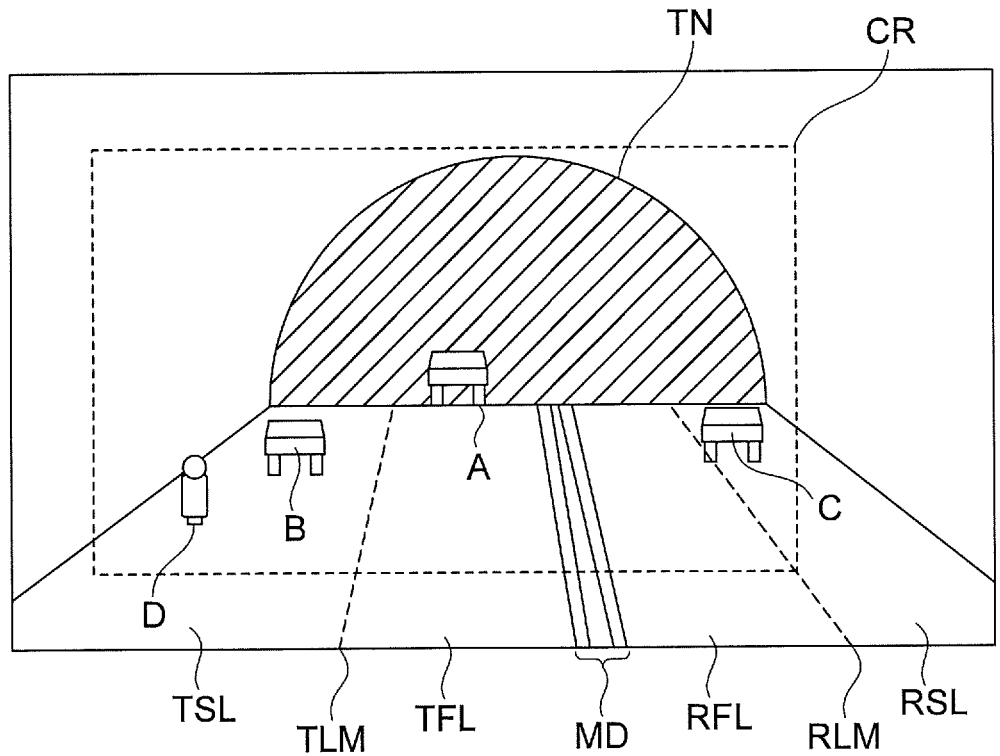
FIG. 3 is a diagram showing an example of a front scene viewed from a host vehicle.

FIG. 3 shows an example of a front scene viewed from the host vehicle in this embodiment. This scene is the target of the image capturing by the image pickup device 2 and the target of the detection by the radar 4.

The illustrated example assumes a case where the host vehicle (not shown) is traveling in a passing lane TFL of a road with two lanes on each side and is approaching a tunnel TN.

A small-sized vehicle A is traveling in the passing lane TFL in the tunnel TN, a large-sized vehicle B is traveling in a slow lane TSL before the tunnel TN, and a motorcycle D is traveling after the large-sized vehicle B. A small-sized vehicle C coming out from the tunnel TN is traveling in a slow lane RSL in the opposite direction. No vehicle is traveling in a passing lane RFL in the opposite direction.

Examples of the large-sized vehicle include large trucks and buses. Examples of the small-sized vehicle include passenger cars. Besides, there can also be a pedestrian on the road. In the following description, the aforementioned vehicles A-D can be referred to as objects. Each pedestrian is also handled as a type of object.

The lanes in the traveling direction and the lanes in the opposite direction are separated from each other by a median MD. A lane marking TLM is drawn between the slow lane TSL and the passing lane TFL in the traveling direction. A lane marking RLM is drawn between the slow lane RSL and the passing lane RFL in the opposite direction.

It is assumed in the following explanation that the time period is in the daytime, the weather is sunny, the outside of the tunnel TN is bright, and the inside of the tunnel TN is dark.

Figure 4:
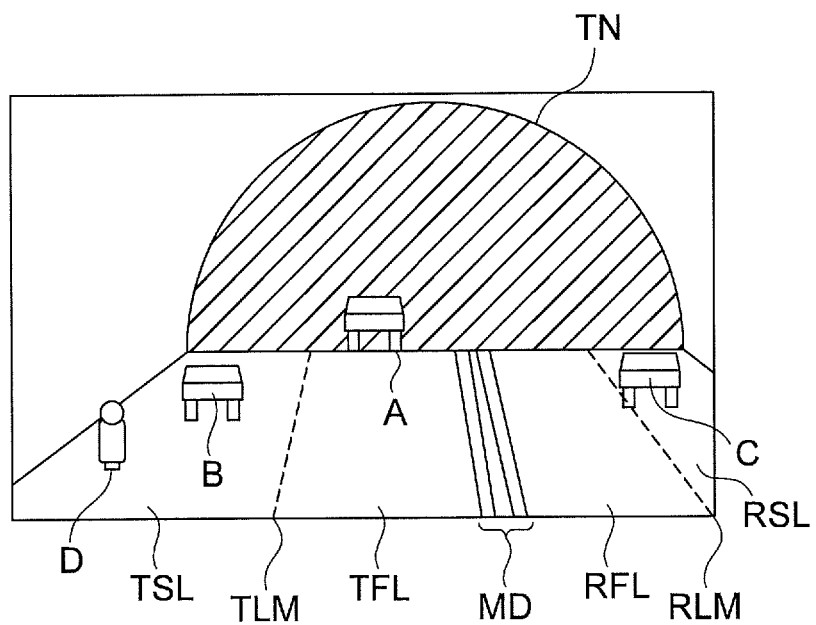
FIG. 4 is a diagram showing an imaging field angle range and a detection range of the radar in the front scene shown in FIG. 3.

In the front scene shown in FIG. 3, an image of subjects in the range indicated by a dotted line frame CR (imaging field angle range) is captured by the image pickup device 2 and a captured image shown in FIG. 4 is obtained. As mentioned earlier, the detection range of the radar 4 is assumed to be identical with the range indicated by the dotted line frame CR in FIG. 3 (imaging field angle range).

Figure 5:
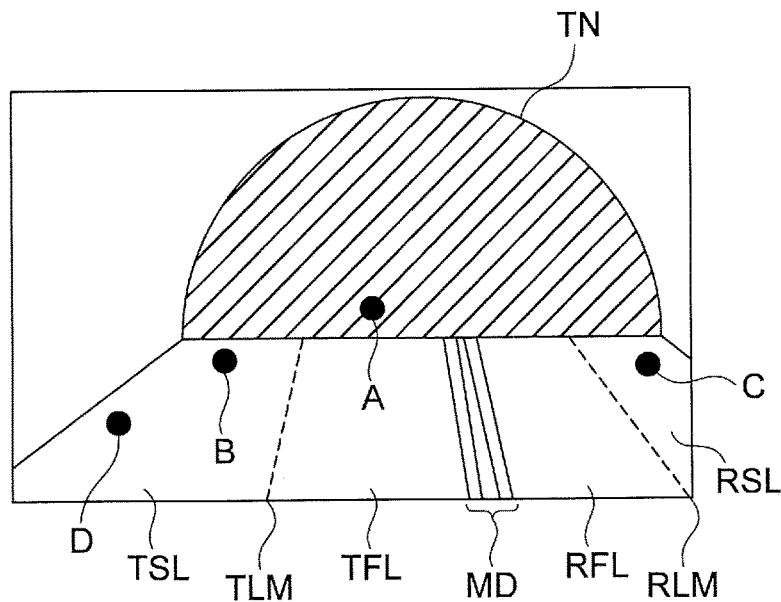
FIG. 5 is a diagram showing positions of objects in the detection range detected by the radar in the detection range of FIG. 4.

In regard to the detection range of FIG. 4, the radar 4 supplies the position information D4 on the detected objects to the attention object selection circuit 5. The positions of the objects detected by means of the detection by the radar 4 are indicated by filled circles in FIG. 5. FIG. 5 shows the objects while overlapping them with the background scene (the tunnel TN, the median MD and the lane markings TLM and RLM) in order to clarify the positional relationship among the detected objects.

In the detection by the radar 4, when an object is farther than a certain distance and the time it takes for the reflected wave to return is longer then a preset time or the intensity of the reflected wave is lower than a preset value, such an object is handled as not existing or not detected.

In the example shown in FIG. 5, the radar 4 has detected the object A, the object B, the object C and the object D.

The radar 4 outputs the information (direction information) D4$a$ representing the direction of each of the objects viewed from the host vehicle and the information (distance information) D4$b$ representing the distance from the host vehicle to each of the objects, for example, as the information (position information) D4 representing the position of each of the detected objects.

As the position information D4, information representing the position of the center of each object is outputted.

In this case, the direction of the center of a direction range in which the reflected wave from the same object is received or the direction in which the intensity of the reflected wave from the same object is the strongest is regarded as the direction of the center of the object.

Further, a distance calculated based on the reflected wave from the direction of the center of the object is handled as the distance to the center of the object.

It is assumed that the radar 4 is a radar having relatively low performance and the output of the radar 4 is not sufficient to precisely learn the size and the shape of each object, and thus not sufficient to determine the type of each object.

As mentioned earlier, the attention object selection circuit 5 evaluates the attention degree of each object based on the position information D4 on each object supplied from the radar 4, selects an object having the highest attention degree, and outputs the information D5 representing the position of the selected object. The information D5 representing the position of the object includes the information D5$a$ representing the position of the object in the captured image and the information D5$b$ representing the distance to the object.

The information D5$a$ representing the position of the object in the captured image is information representing the position of the center of the object in the captured image, for example. The information D5$b$ representing the distance to the object is information representing the distance to the center of the object, for example. The outputted information D5 is supplied to the attention region specification circuit 6.

As mentioned earlier, the direction represented by the position information D4 outputted from the radar 4 is associated with a position in the captured image, and it is possible to determine a position in the captured image corresponding to the position of the center of the object detected by the radar 4. Thus, from the information D4$a$ representing the direction of each object outputted from the radar 4, the information D5$a$ representing the position of the same object in the captured image can be generated.

As the information D5$b$ representing the distance to each object, the information D4$b$ representing the distance to the same object outputted from the radar 4 can be used without change.

In the evaluation of the attention degree of each object by the attention object selection circuit 5, the attention degree is increased with the decrease in the distance from the host vehicle, for example.

In the example of FIG. 5, the object D is at the shortest distance from the host vehicle, and thus is judged to have the highest attention degree. In this case, the attention object selection circuit 5 selects the object D.

The attention region specification circuit 6 specifies the attention region in the captured image in regard to the object selected by the attention object selection circuit 5. For example, a region centering at the center of the object selected by the attention object selection circuit 5 and having a size corresponding to the distance to the object is specified as the attention region. The attention region is a rectangular region having a pair of sides extending in the horizontal direction and a pair of sides extending in the vertical direction.

The size of the attention region is a size containing the whole of a part of the captured image that is estimated to be occupied by the object, i.e., an image part corresponding to the object, in a case where the selected object is assumed to be of the largest type among presumed plurality of types of objects, namely, a large-sized vehicle. For the estimation of the size, the distance to the selected object is taken into consideration. This is because even the same large-sized vehicle appears in different sizes in the captured image depending on the distance.

The reason why the selected object is assumed to be of the largest type among the presumed plurality of types of objects, namely, a large-sized vehicle, in the estimation of the size of the object appearing in the captured image is to make the attention region contain the part of the captured image corresponding to the object (the object appearing in the captured image) irrespective of the type of the selected object.

Figure 6:
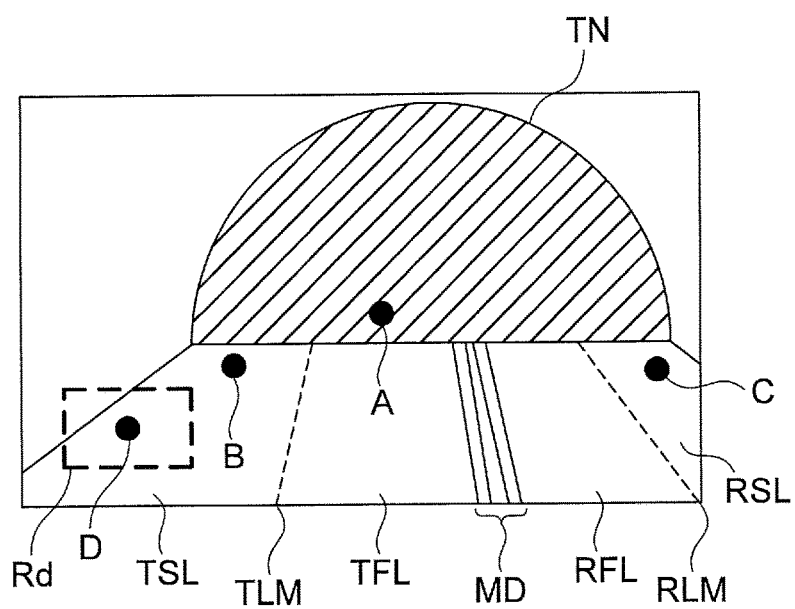
FIG. 6 is a diagram showing an example of an attention region specified for one object selected from the objects shown in FIG. 5 based on the distance.

FIG. 6 shows a case where a rectangular region containing the selected object D is specified as the attention region Rd.

FIG. 6 shows not only the object D contained in the specified attention region Rd but also the objects A, B and C together with the background scene (the tunnel TN, the median MD and the lane markings LM). This is for clarifying the positional relationship regarding the attention region Rd.

The attention region specification circuit 6 generates information specifying the attention region Rd shown in FIG. 6 and supplies the information to the brightness calculation circuit 7.

The brightness calculation circuit 7 calculates the luminance average value Yav by performing the detection on the luminance signal Y3 outputted from the camera signal processing circuit 3 by using the attention region Rd as the detection frame, and supplies the result of the calculation to the exposure control circuit 8.

The exposure control circuit 8 compares the luminance average value Yav calculated by the brightness calculation circuit 7 with the luminance target value Yrf and performs the exposure control based on the result of the comparison.

In the example shown in FIG. 6, the whole of the attention region Rd is situated outside of the tunnel TN. In the daytime with sunny weather, the outside of the tunnel TN is bright. Therefore, the luminance average value Yav of the part in the attention region Rd is high in the captured image. When the luminance average value Yav is high as above, the adjustment for decreasing the exposure time or the adjustment for decreasing the signal amplification gain is made.

As a result, the brightness of the image represented by the image signal D3 outputted from the camera signal processing circuit 3 changes and an image in which the brightness has been optimally controlled in the attention region Rd is obtained. Specifically, an image with high visibility of the object D in the attention region Rd, with no blown out highlights in the image part in the attention region Rd, is obtained.

Figure 7:
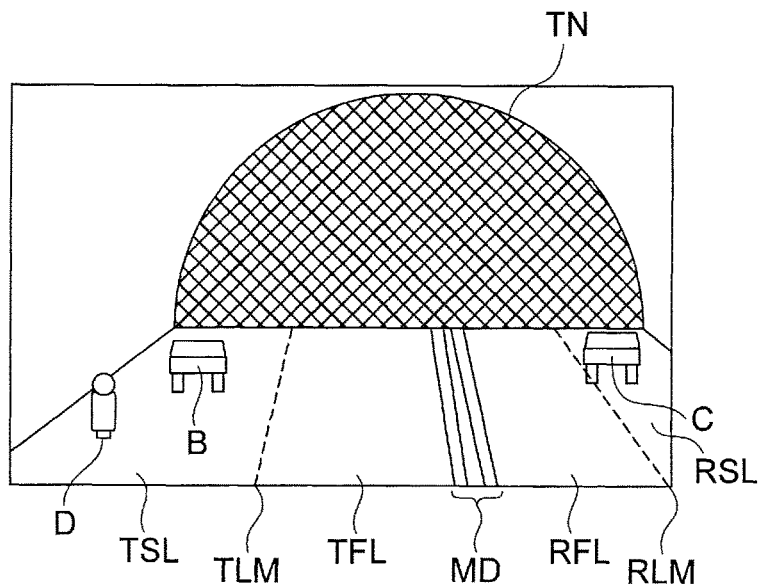
FIG. 7 is a diagram showing an example of an image obtained as the result of exposure control performed by using the attention region of FIG. 6 as a detection frame.

For example, as shown in FIG. 7, even though the inside of the tunnel TN is blocked up to black, an image with appropriate brightness control of the outside of the tunnel TN, especially the attention region Rd and accordingly the object D situated therein, is obtained.

The above explanation has been given of a case where the scene as the image capturing target of the image pickup device 2 and the detection target of the radar 4 is a scene in the vicinity of the entrance of a tunnel. A case where the scene as the image capturing target of the image pickup device 2 and the detection target of the radar 4 is a scene in the vicinity of the exit of a tunnel will be explained below.

Figure 8:
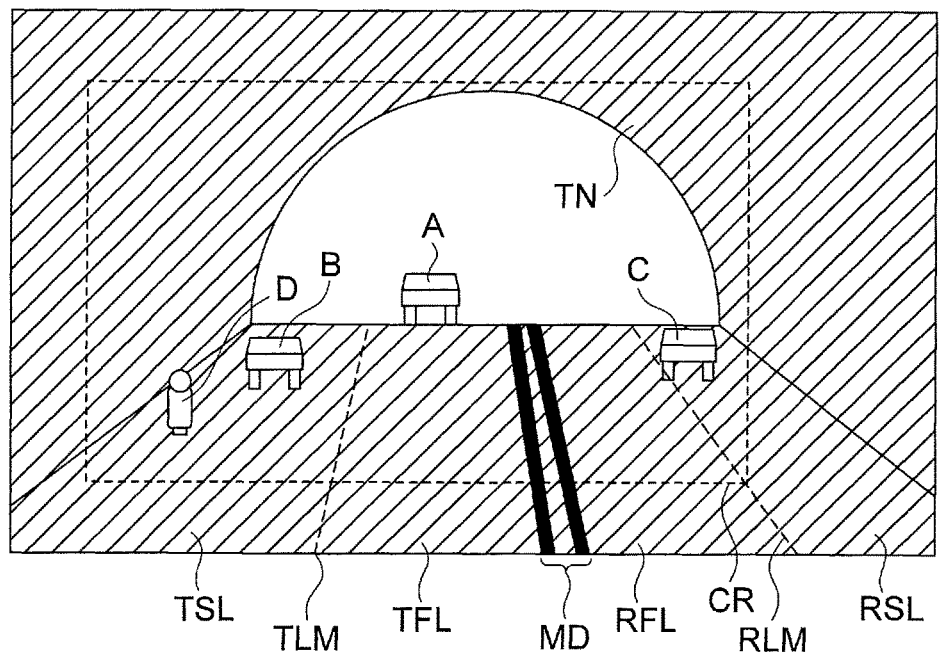
FIG. 8 is a diagram showing another example of the front scene viewed from the host vehicle.

FIG. 8 shows an example of the front scene viewed from the host vehicle in the vicinity of the exit of the tunnel. FIG. 8 assumes a case where the host vehicle is traveling in the passing lane TFL in the same way as in FIG. 3, the same objects A-D as in FIG. 3 are situated at the same relative positions with respect to the host vehicle, the objects B, C and D on the near side exist on the inside of the tunnel and have low luminance, and the object A on the far side exists on the outside of the tunnel and has high luminance.

In the front scene shown in FIG. 8, subjects in the range indicated by the dotted line frame CR (imaging field angle range) are assumed to be in the imaging field angle range of the image pickup device 2 and in the detection range of the radar 4.

Figure 9:
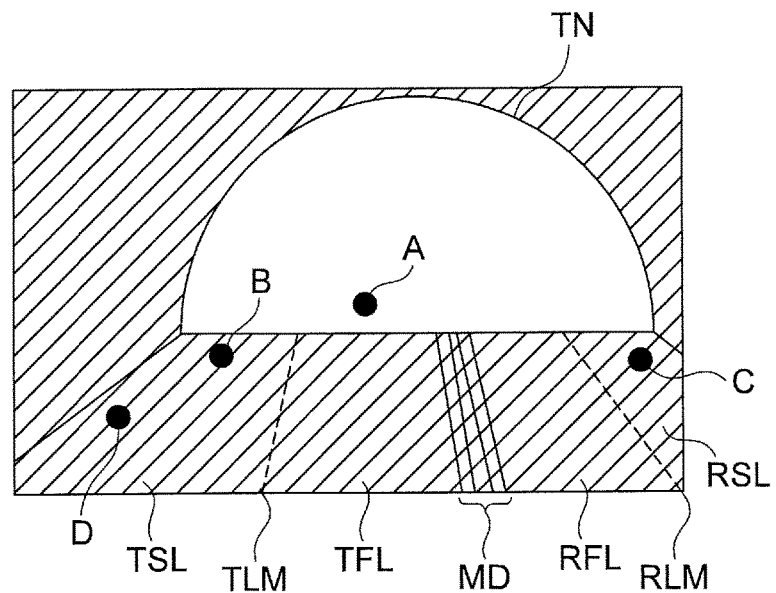
FIG. 9 is a diagram showing positions of objects in the detection range detected by the radar in the detection range of FIG. 8.

FIG. 9 shows the positions of the objects in the front scene of FIG. 8 detected by the radar 4.

The result of the detection by the radar 4 is identical with that shown in FIG. 5 since the relative positions of the objects A-D with respect to the host vehicle are the same as those in FIG. 3 as mentioned above.

In regard to the objects in FIG. 9, based on the position information and the distance information on the objects outputted from the radar 4, the attention object selection circuit 5 selects an object having the highest attention degree and the attention region specification circuit 6 specifies the attention region in the captured image. This operation is equivalent to the operation in the case of FIG. 5, that is, in the case where the target scene is situated in the vicinity of the entrance of the tunnel.

Figure 10:
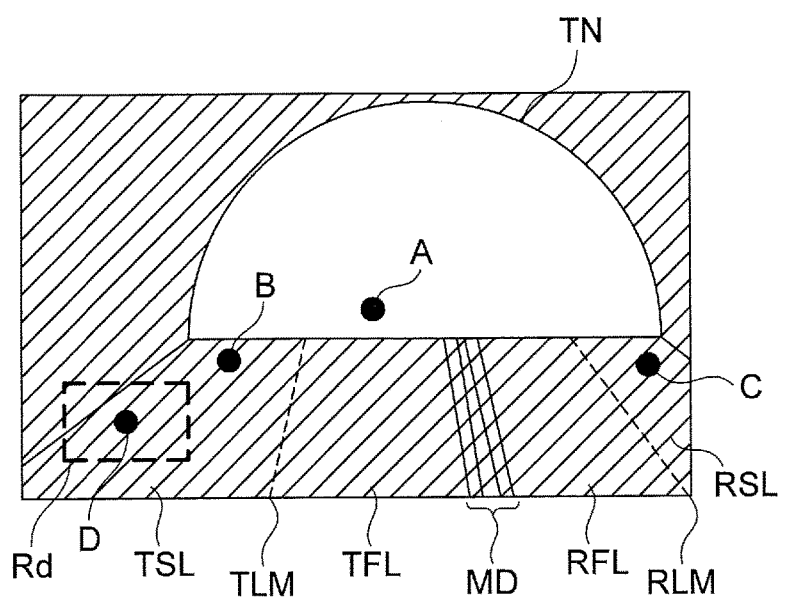
FIG. 10 is a diagram showing an example of the attention region specified for one object selected from the objects shown in FIG. 8 based on the distance.

For example, it is assumed that the object D closest to the host vehicle has been selected as the attention object and the attention region Rd corresponding to the object D has been specified as shown in FIG. 10.

As shown in FIG. 10, the attention region Rd is situated inside of the tunnel TN and the luminance average value of the attention region Rd is low, and thus the adjustment for increasing the exposure time or the adjustment for increasing the signal amplification gain is made, for example.

Figure 11:
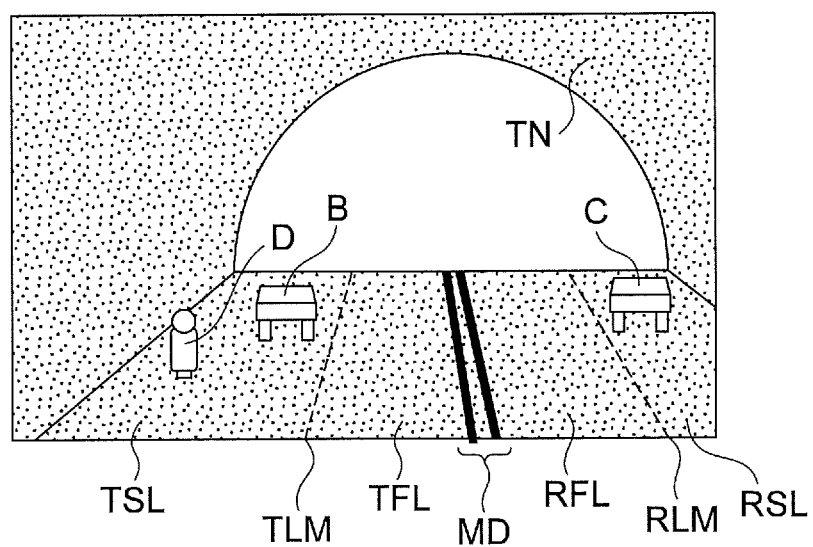
FIG. 11 is a diagram showing an example of an image obtained as the result of exposure control performed by using the attention region of FIG. 10 as the detection frame.

Consequently, as shown in FIG. 11, an image with high visibility of the object D is obtained even though the object A situated outside of the tunnel is blown out to white.

According to the embodiment described above, an image in which the brightness of the object to be paid attention to has been appropriately controlled can be obtained by the combination of the radar and the image pickup device.

In systems detecting an obstacle by using a radar alone without using an image pickup device, there are cases where it is impossible to determine the type of the obstacle, such as cases where it is even impossible to judge whether the obstacle is a vehicle or not.

In contrast, in the above-described embodiment, the exposure control is performed by the combination of the radar and the image pickup device so that the object of the highest attention degree among the objects detected by the radar is optimally exposed, and thus an effect is achieved in that the object of high attention degree can be viewed without being blocked up to black or being blown out to white. This is advantageous for driving support or accident prevention.

Further, since the radar is only required to obtain information representing the direction and the distance regarding each object, a radar of relatively low performance and low price can be used and the image capturing device can be implemented at a low cost.

Furthermore, since an object closest to the host vehicle among the objects detected by the radar is selected and a region containing the object is specified as the attention region in the above embodiment, the visibility of the closest object increases and that is advantageous for avoiding an impending risk of collision.

Second Embodiment

Figure 12:
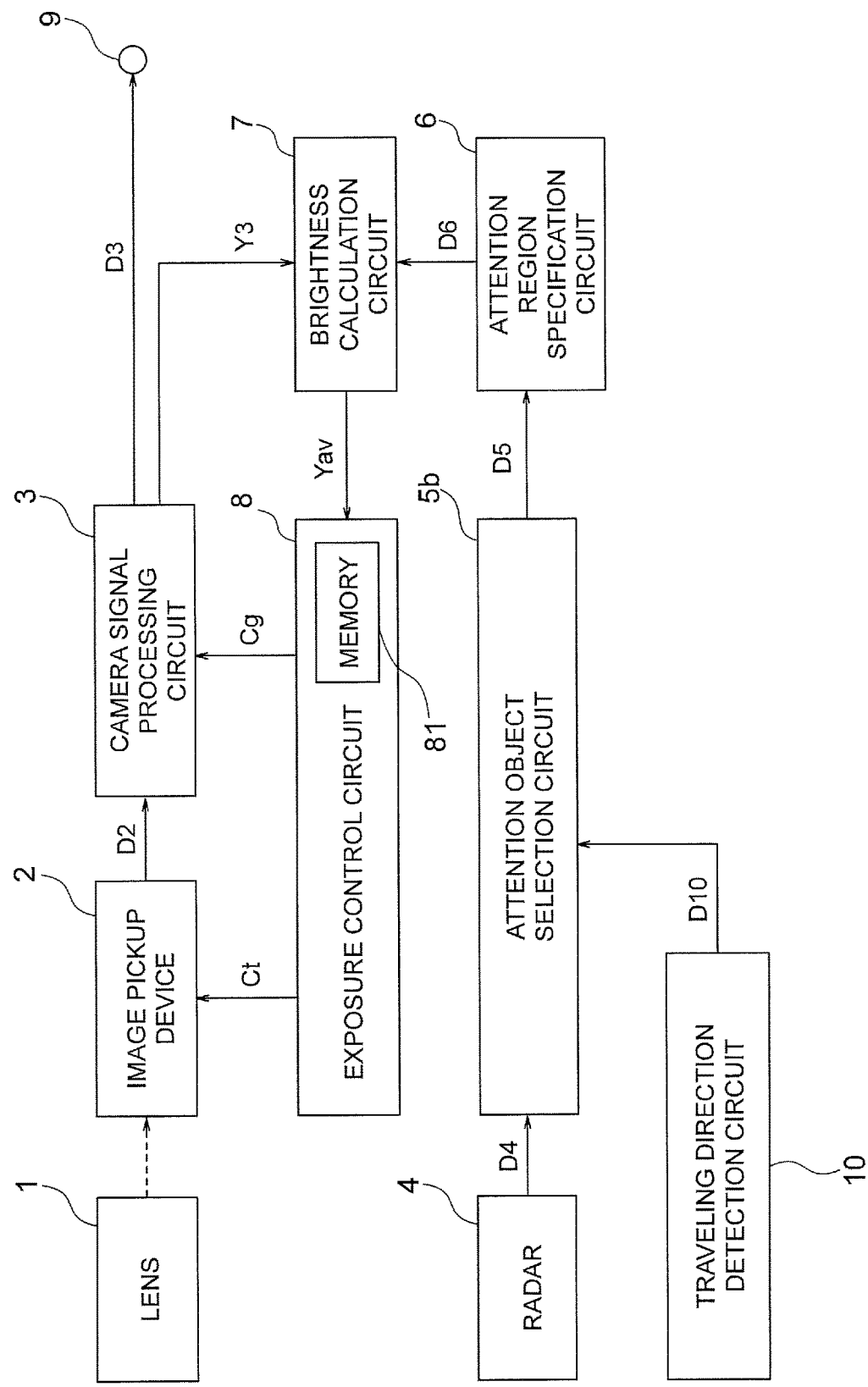
FIG. 12 is a block diagram showing a configuration of an image capturing device according to a second embodiment of the present invention.

FIG. 12 is a block diagram showing a configuration of an image capturing device according to a second embodiment of the present invention.

The image capturing device of FIG. 12 is roughly equivalent to the image capturing device of FIG. 1 but differs in that an attention object selection circuit 5b is provided instead of the attention object selection circuit 5 and a traveling direction detection circuit 10 is added.

The operation of the other components is equivalent to that in the explanation of FIG. 1 in the first embodiment, and thus repeated explanation thereof is omitted.

The traveling direction detection circuit 10 detects the traveling direction of the host vehicle based on the steering direction of a steering wheel of the host vehicle and supplies information D10 representing the traveling direction to the attention object selection circuit 5b.

The attention object selection circuit 5b in FIG. 12 is roughly equivalent to the attention object selection circuit 5 in FIG. 1 but differs in the following points:

The attention object selection circuit 5b evaluates the attention degree of each object based on the information D10 representing the traveling direction of the host vehicle supplied from the traveling direction detection circuit 10 and the position information D4 (the direction information D4a and the distance information D4b) on each object supplied from the radar 4, selects an object having a relatively high attention degree, such as an object having the highest attention degree, based on the result of the evaluation, and supplies the information D5 representing the position of the selected object to the attention region specification circuit 6.

For example, the attention degree is determined by increasing a direction evaluation value as the direction of each object becomes closer to the traveling direction of the host vehicle and increasing a distance evaluation value with the decrease in the distance to each object and totalizing the direction evaluation value and the distance evaluation value. In this case, the attention degree is increased with the increase in the direction evaluation value and increased with the increase in the distance evaluation value. Then, an object having the highest attention degree is selected.

For example, it is assumed that the radar 4 has detected the objects A-D shown in FIG. 5 as the result of performing the object detection on the scene of FIG. 3 as the target of detection and the attention object selection circuit 5b has judged that the attention degree of the object A in the same lane as the host vehicle is the highest as the result of performing the attention degree evaluation on the detected objects A-D while attaching importance to the traveling direction of the host vehicle.

The attention object selection circuit 5b notifies the attention region specification circuit 6 of the position of the object A judged to have the highest attention degree.

The attention region specification circuit 6 specifies the attention region in regard to the position of the object A having the high attention degree.

Figure 13:
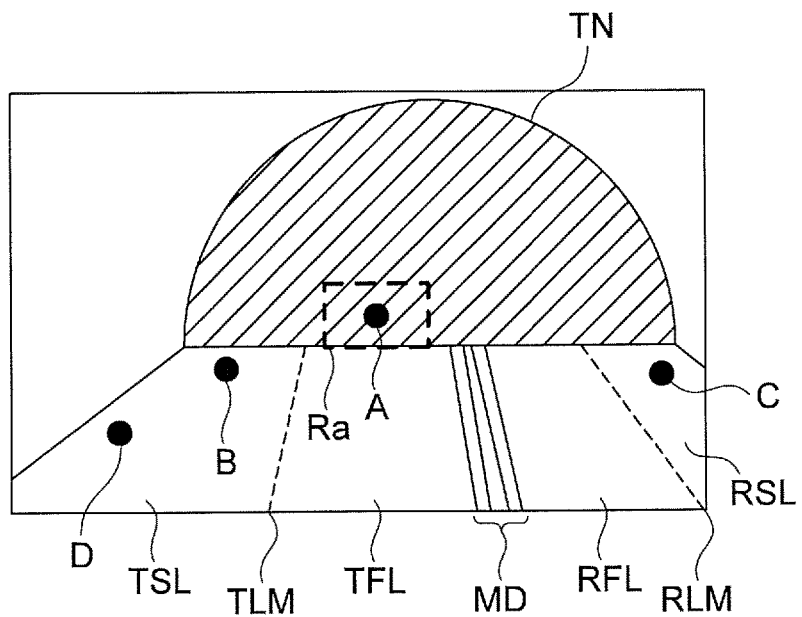
FIG. 13 is a diagram showing an example of the attention region specified for one object selected from the objects shown in FIG. 5 based on the direction and the distance.

Also in this case, as explained in the first embodiment, a region Ra centering at the center of the object A selected by the attention object selection circuit 5b and having a size determined according to the distance to the object A and on the assumption that the object A is a large-sized vehicle is specified. For example, the region Ra shown in FIG. 13 is specified and the brightness calculation circuit 7 is notified of the region Ra as the attention region.

The brightness calculation circuit 7 calculates the luminance average value Yav by performing the detection on the luminance signal Y3 outputted from the camera signal processing circuit 3 by using the attention region Ra as the detection frame, and supplies the result of the calculation to the exposure control circuit 8.

The exposure control circuit 8 performs the exposure control based on the luminance average value Yav.

The object A is situated in the tunnel TN and the region Ra is situated in a part of the captured image in the tunnel TN.

Since the luminance average value of the region Ra in the tunnel TN is relatively low, the adjustment for increasing the exposure time or the adjustment for increasing the signal amplification gain is made, for example. Consequently, a captured image in which the brightness has been optimally controlled in the attention region Ra is obtained. Specifically, an image with high visibility of the object A in the attention region Ra, with no blocked up shadows in the image part in the attention region Ra, is obtained.

Figure 14:
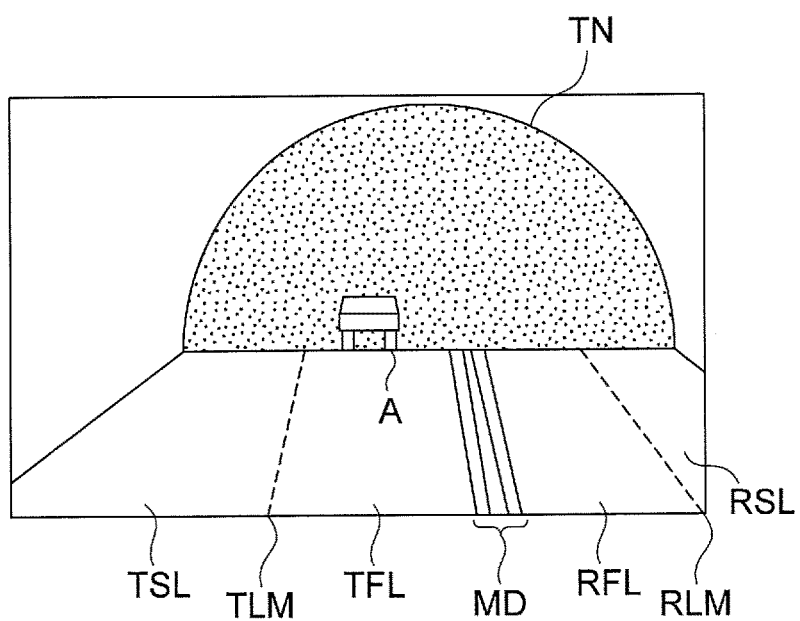
FIG. 14 is a diagram showing an example of an image obtained as the result of exposure control performed by using the attention region of FIG. 13 as the detection frame.

For example, as shown in FIG. 14, even though the outside of the tunnel TN is blown out to white, an image with appropriate brightness control of the inside of the tunnel TN is obtained. The vehicles B, C and D are not shown in FIG. 14 to indicate the blown out highlights. The median MD and the lane markings LM, which can also become invisible in the image due to the blown out highlights, are shown in FIG. 14 to indicate the positional relationship regarding the vehicle B. In contrast, the brightness is appropriately controlled for the attention region situated in the tunnel TN and thus for the object A situated therein, and an image with high visibility of the object A is obtained.

The above explanation has been given of a case where the scene as the image capturing target of the image pickup device 2 and the detection target of the radar 4 is a scene in the vicinity of the entrance of the tunnel as shown in FIG. 3. A case where the scene as the image capturing target of the image pickup device 2 and the detection target of the radar 4 is a scene in the vicinity of the exit of the tunnel as shown in FIG. 8 will be explained below.

In this case, the positions of the objects detected by the radar 4 are as shown in FIG. 9. The attention object selection circuit 5b makes the evaluation of the attention degree while attaching importance to the traveling direction of the host vehicle, and consequently, judges that the object A situated in the same lane as the host vehicle has the highest attention degree. Then, the attention region specification circuit 6 specifies the attention region Ra corresponding to the object A as shown in FIG. 15.

Figure 15:
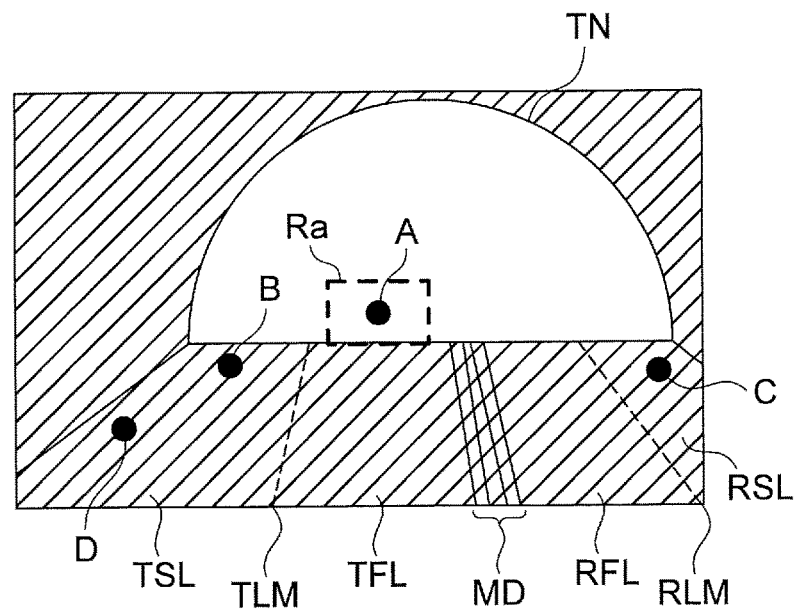
FIG. 15 is a diagram showing an example of the attention region specified for one object selected from the objects shown in FIG. 8 based on the direction and the distance.
Figure 16:
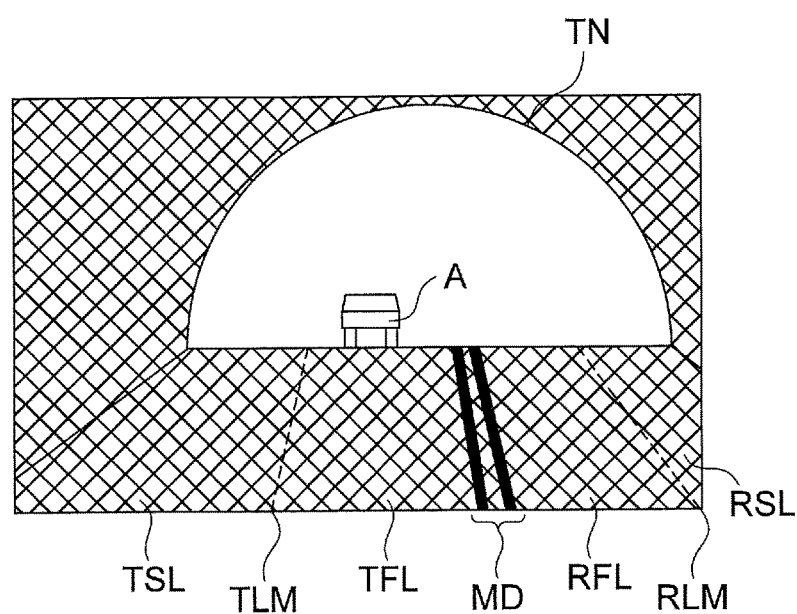
FIG. 16 is a diagram showing an example of an image obtained as the result of exposure control performed by using the attention region of FIG. 15 as the detection frame.

As shown in FIG. 15, the attention region Ra is situated outside of the tunnel TN and the luminance average value of the attention region is high, and thus the exposure control circuit 8 makes the adjustment for decreasing the exposure time or the adjustment for decreasing the signal amplification gain, for example. Consequently, as shown in FIG. 16, an image with high visibility of the object A is obtained even though the objects B, C and D in the tunnel are blocked up to black.

While the above example assumes a case where the imaging direction of the image pickup device 2 coincides with the forward direction of the vehicle body of the host vehicle, the traveling direction of the host vehicle may be calculated based on the angle made by the imaging direction of the image pickup device 2 with respect to the forward direction of the vehicle body of the host vehicle and the steering direction of the steering wheel in cases where the imaging direction of the image pickup device 2 does not coincide with the forward direction of the vehicle body of the host vehicle.

As above, the exposure control is performed so that an object in a direction closer to the traveling direction of the host vehicle and at a shorter distance from the host vehicle among the objects detected by the radar is optimally exposed, which is advantageous for the prevention of rear-end collisions.

Third Embodiment

Figure 17:
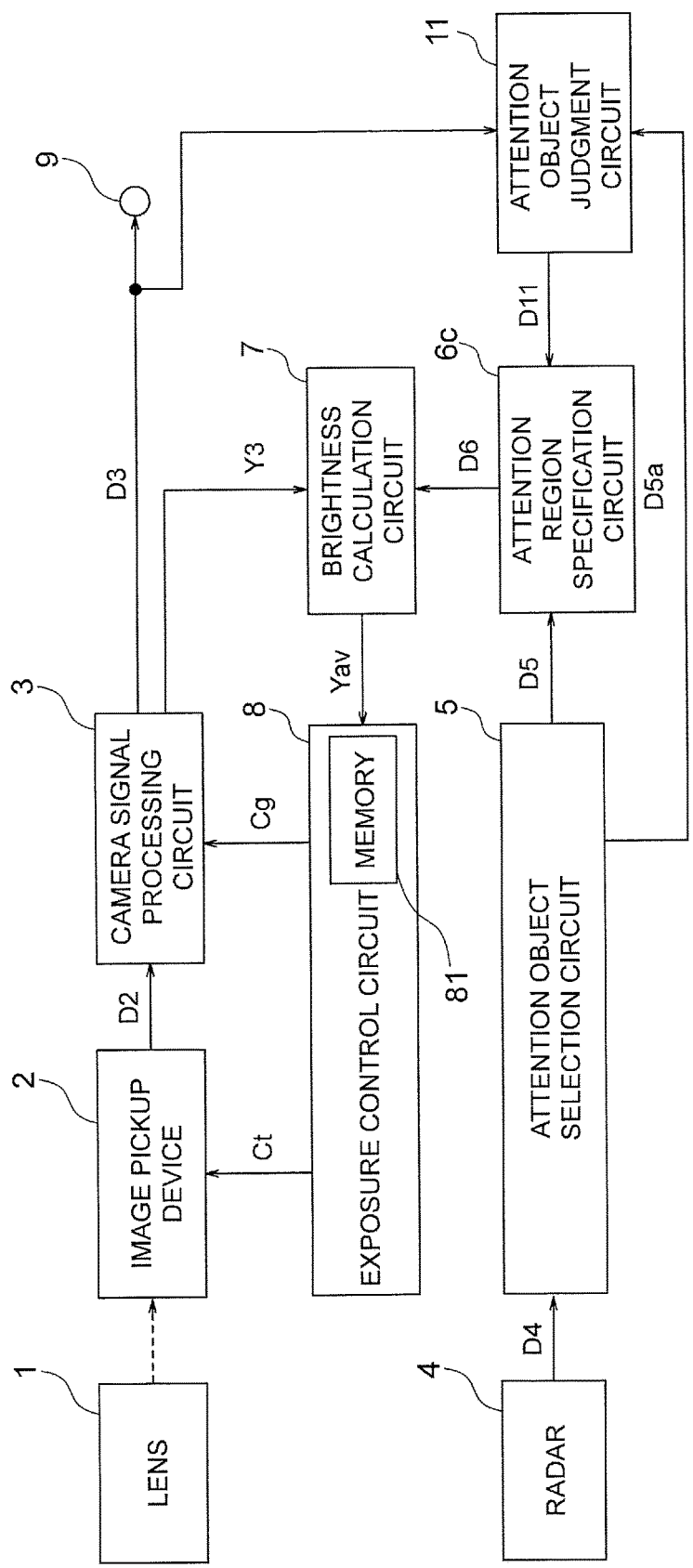
FIG. 17 is a block diagram showing a configuration of an image capturing device according to a third embodiment of the present invention.

FIG. 17 is a block diagram showing a configuration of an image capturing device according to a third embodiment of the present invention.

The image capturing device of FIG. 17 is roughly equivalent to the image capturing device of FIG. 1, but an attention object judgment circuit 11 is added and an attention region specification circuit 6c is provided instead of the attention region specification circuit 6.

The attention object judgment circuit 11 receives the image signal D3 from the camera signal processing circuit 3 while receiving the information D5a representing the position of the attention object in the captured image from the attention object selection circuit 5.

The attention object judgment circuit 11 judges the type of the object by analyzing an image of a region in the image signal D3 at the position represented by the information D5a and having a preset size (analysis region).

The judgment of the type of the object is made to determine which of a large-sized vehicle such as a truck or a bus, a small-sized vehicle such as a passenger car, a two-wheel vehicle, a pedestrian, etc. the object corresponding to an image part included in the analysis region is.

Information D11 representing the result of the judgment is supplied to the attention region specification circuit 6c.

The size of the analysis region is determined to coincide with the size of the image part corresponding to the selected object in the image in the case where the object selected by the attention object selection circuit 5 is assumed to be a large-sized vehicle. Also in this case, the distance to the object is taken into consideration.

The attention region specification circuit 6c receives the information D5 representing the position of the selected object from the attention object selection circuit 5, receives the information D11 representing the type of the selected object from the attention object judgment circuit 11, and specifies the attention region corresponding to the selected object based on these pieces of information.

When the result of the judgment by the attention object judgment circuit 11 indicates that the attention object is a large-sized vehicle, the attention region specified by the attention region specification circuit 6c is the same as the attention region in the first embodiment.

When the result of the judgment indicates that the attention object is an object other than a large-sized vehicle, the attention region specified by the attention region specification circuit 6c is smaller than the attention region in the first embodiment.

The attention region specification circuit 6c supplies the information D6 representing the attention region to the brightness calculation circuit 7.

The attention object selection circuit 5 selects an object having the highest attention degree based on the distance among the objects detected by the radar 4 similarly to the case of FIG. 1. For example, it is assumed that the positions of the objects are as shown in FIG. 5 and the attention object selection circuit 5 judges the object D as the object having the highest attention degree.

In this case, the attention object judgment circuit 11 receives the information D5a representing the position of the object D in the captured image from the attention object selection circuit 5, analyzes the image part of the image signal D3 corresponding to the position represented by the information D5a, thereby judges that the object D is a two-wheel vehicle, and supplies the information D11 representing the result of the judgment to the attention region specification circuit 6c.

Figure 18:
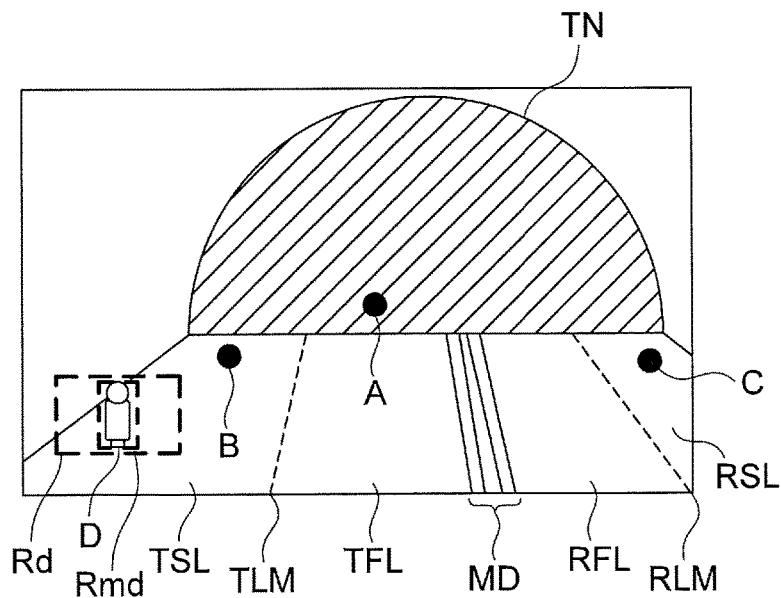
FIG. 18 is a diagram showing an example of the attention region specified based on an object judgment result for one object selected from the objects shown in FIG. 5 based on the distance.

The attention region specification circuit 6c recognizes that the object D is a two-wheel vehicle based on the information D11 and outputs a part of the captured image that is estimated to be occupied by the object D in the case where the object D is a two-wheel vehicle, that is, a region Rmd (FIG. 18) including the image part corresponding to the object D, as the attention region. Also in this case, the distance is taken into consideration. FIG. 18 also shows the attention region Rd according to the first embodiment for comparison.

The attention region specification circuit 6c supplies information representing the attention region Rmd to the brightness calculation circuit 7.

The brightness calculation circuit 7 calculates the luminance average value Yav by performing the detection on the luminance signal Y3 outputted from the camera signal processing circuit 3 based on the information supplied from the attention region specification circuit 6c and by using the attention region Rmd as the detection frame, and supplies the result of the calculation to the exposure control circuit 8.

The exposure control circuit 8 performs the exposure control based on the luminance average value Yav of the attention region Rmd calculated by the brightness calculation circuit 7.

In the example shown in FIG. 18, the whole of the attention region Rmd is situated outside of the tunnel TN. Thus, the luminance average value Yav of the attention region is high. In such cases where the luminance average value Yav is high, the adjustment for decreasing the exposure time or the adjustment for decreasing the signal amplification gain is made.

As a result, the brightness of the image represented by the image signal D3 outputted from the camera signal processing circuit 3 changes and a captured image in which the brightness has been optimally controlled in the attention region Rmd is obtained. Specifically, an image with high visibility of the object D in the attention region Rmd, with no blown out highlights in the image part in the attention region Rmd, is obtained.

Figure 19:
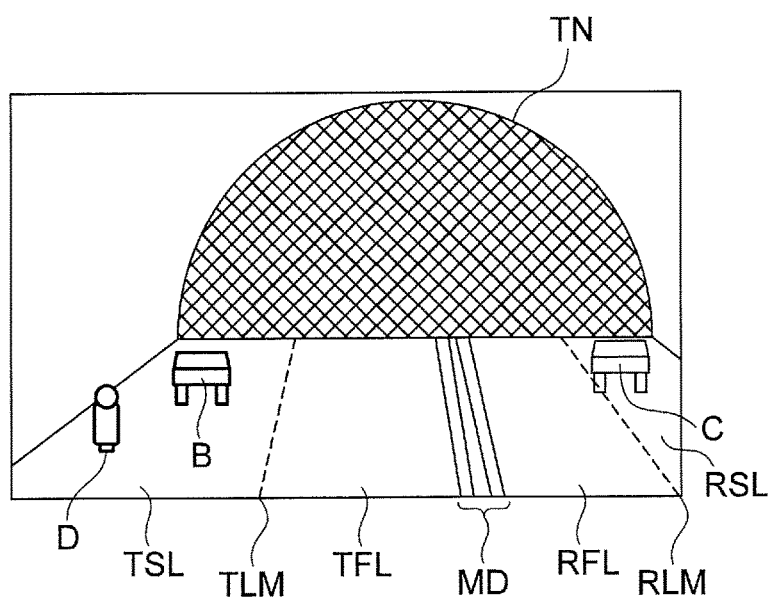
FIG. 19 is a diagram showing an example of an image obtained as the result of exposure control performed by using the attention region of FIG. 18 as the detection frame.

For example, as shown in FIG. 19, even though the inside of the tunnel TN is blocked up to black, an image with appropriate brightness control of the outside of the tunnel TN, especially the attention region Rmd and accordingly the object D situated therein, and with high visibility of the object D is obtained.

Further, since the region Rmd in the captured image is smaller than the region Rd in the first embodiment, a part other than the object D (a part other than the image part corresponding to the object D) becomes smaller and more appropriate exposure control is carried out for the brightness of the object D.

Consequently, the visibility of the object D increases further.

Fourth Embodiment

While the image capturing device of FIG. 17 is a modification to the image capturing device of FIG. 1, a similar modification can be made also to the image capturing device of FIG. 12.

Figure 20:
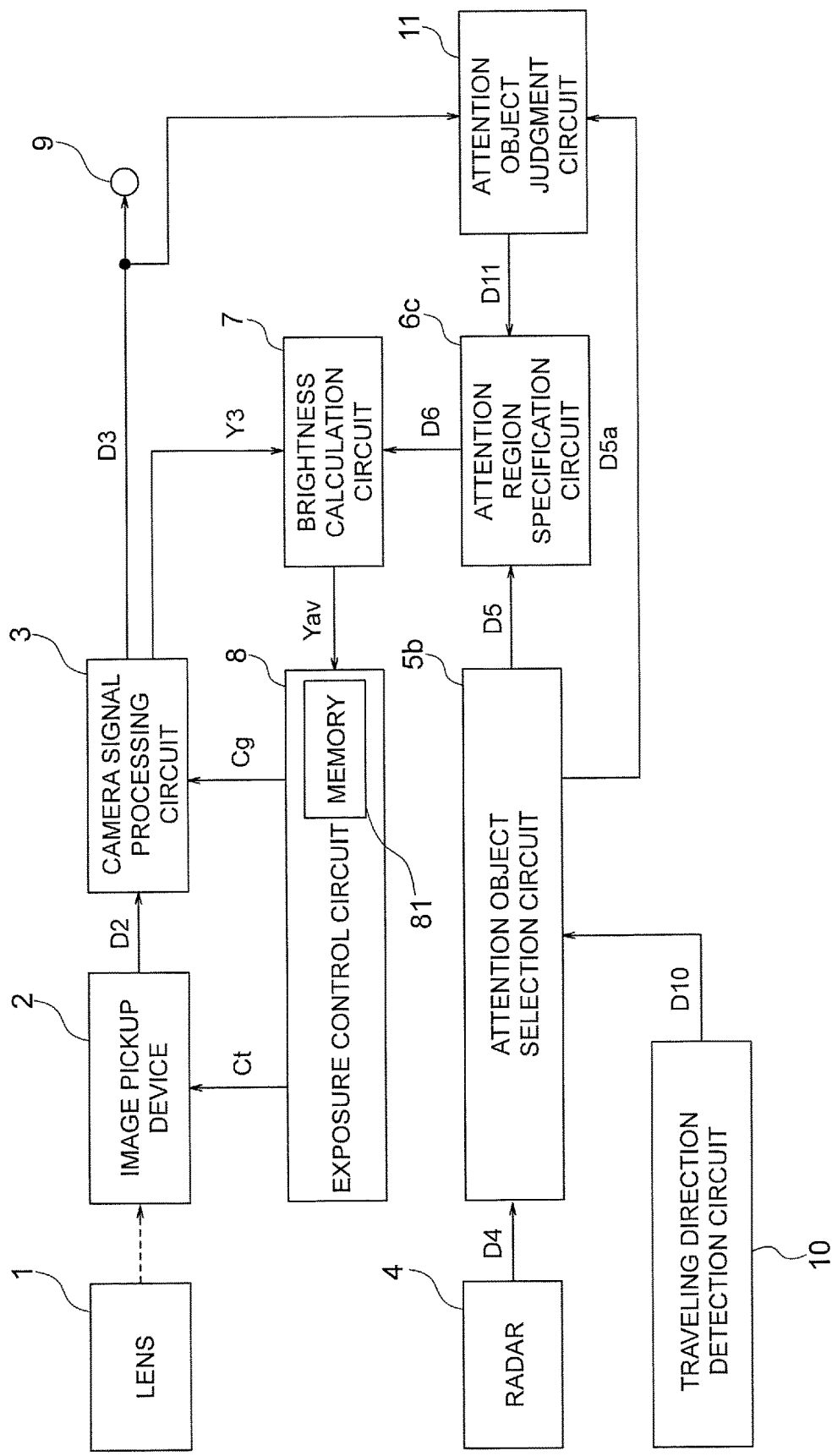
FIG. 20 is a block diagram showing a configuration of an image capturing device according to a fourth embodiment of the present invention.

FIG. 20 is a block diagram showing a configuration of an image capturing device according to a fourth embodiment of the present invention.

The image capturing device of FIG. 20 is roughly equivalent to the image capturing device of FIG. 12, but the attention object judgment circuit 11 is added and the attention region specification circuit 6c is provided instead of the attention region specification circuit 6.

The attention object judgment circuit 11 and the attention region specification circuit 6c are identical with those described in the description of the third embodiment.

The attention object selection circuit 5b determines an object having the highest attention degree among the objects detected by the radar 4 based on the distance and the direction similarly to the case of FIG. 12. For example, it is assumed that the positions of the objects are as shown in FIG. 3 and the attention object selection circuit 5b judges the object A as the object having the highest attention degree.

In this case, the attention object judgment circuit 11 receives the information D5a representing the position of the object A in the captured image from the attention object selection circuit 5b, analyzes the image part of the image signal D3 corresponding to the position represented by the information D5a, thereby judges that the object A is a small-sized vehicle, and supplies the information D11 representing the result of the judgment to the attention region specification circuit 6c.

Figure 21:
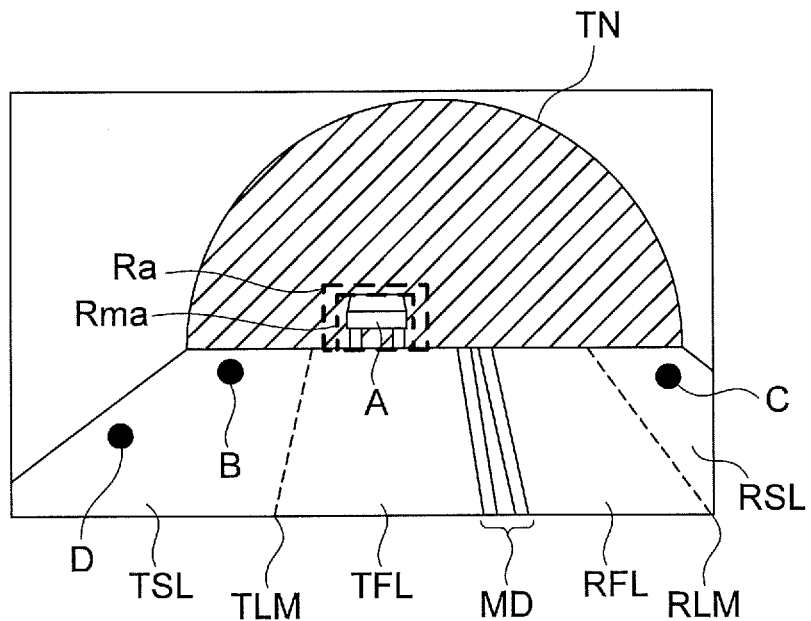
FIG. 21 is a diagram showing an example of the attention region specified considering an object judgment result for one object selected from the objects shown in FIG. 5 based on the direction and the distance.

The attention region specification circuit 6c recognizes that the object A is a small-sized vehicle based on the information D11 and outputs a part of the captured image that includes the object A and is estimated to be occupied by the object A in the case where the object A is a small-sized vehicle, that is, a region Rma (FIG. 21) including the image part corresponding to the object A, as the attention region. Also in this case, the distance is taken into consideration. FIG. 21 also shows the attention region Ra according to the second embodiment for comparison.

The attention region specification circuit 6c supplies information representing the attention region Rma to the brightness calculation circuit 7.

The brightness calculation circuit 7 calculates the luminance average value Yav by performing the detection on the luminance signal Y3 outputted from the camera signal processing circuit 3 based on the information supplied from the attention region specification circuit 6c and by using the attention region Rma as the detection frame, and supplies the result of the calculation to the exposure control circuit 8.

The exposure control circuit 8 performs the exposure control based on the luminance average value Yav of the attention region Rma calculated by the brightness calculation circuit 7.

In the example shown in FIG. 21, the whole of the attention region Rma is situated in the tunnel TN. Thus, the luminance average value Yav of the attention region is low. In such cases where the luminance average value Yav is low, the adjustment for increasing the exposure time or the adjustment for increasing the signal amplification gain is made.

As a result, the brightness of the image represented by the image signal D3 outputted from the camera signal processing circuit 3 changes and a captured image in which the brightness has been optimally controlled in the attention region Rma is obtained. Specifically, an image with high visibility of the object A in the attention region Rma, with no blocked up shadows in the image part in the attention region Rma, is obtained.

Figure 22:
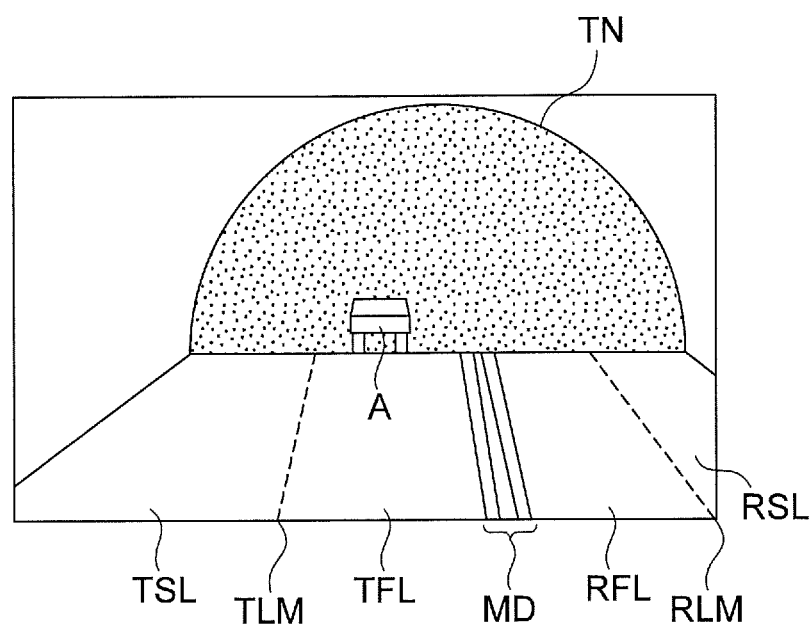
FIG. 22 is a diagram showing an example of an image obtained as the result of exposure control performed by using the attention region of FIG. 21 as the detection frame.

For example, as shown in FIG. 22, even though the outside of the tunnel TN is blown out to white, an image with appropriate brightness control of the inside of the tunnel TN, especially the attention region Rma and accordingly the object A situated therein, and with high visibility of the object A is obtained.

Further, since the region Rma in the captured image is smaller than the region Ra in the second embodiment, a part other than the object A (a part other than the image part corresponding to the object A) becomes smaller and more appropriate exposure control is carried out for the brightness of the object A.

Consequently, the visibility of the object A increases further.

As above, in the third and fourth embodiments, the detection frame is determined according to the size of the object, and thus the size of the detection frame can be made closer to the size of the object, an image with more appropriate brightness control of the object can be obtained, and accordingly, the visibility of the object in the image increases.

Fifth Embodiment

Figure 23:
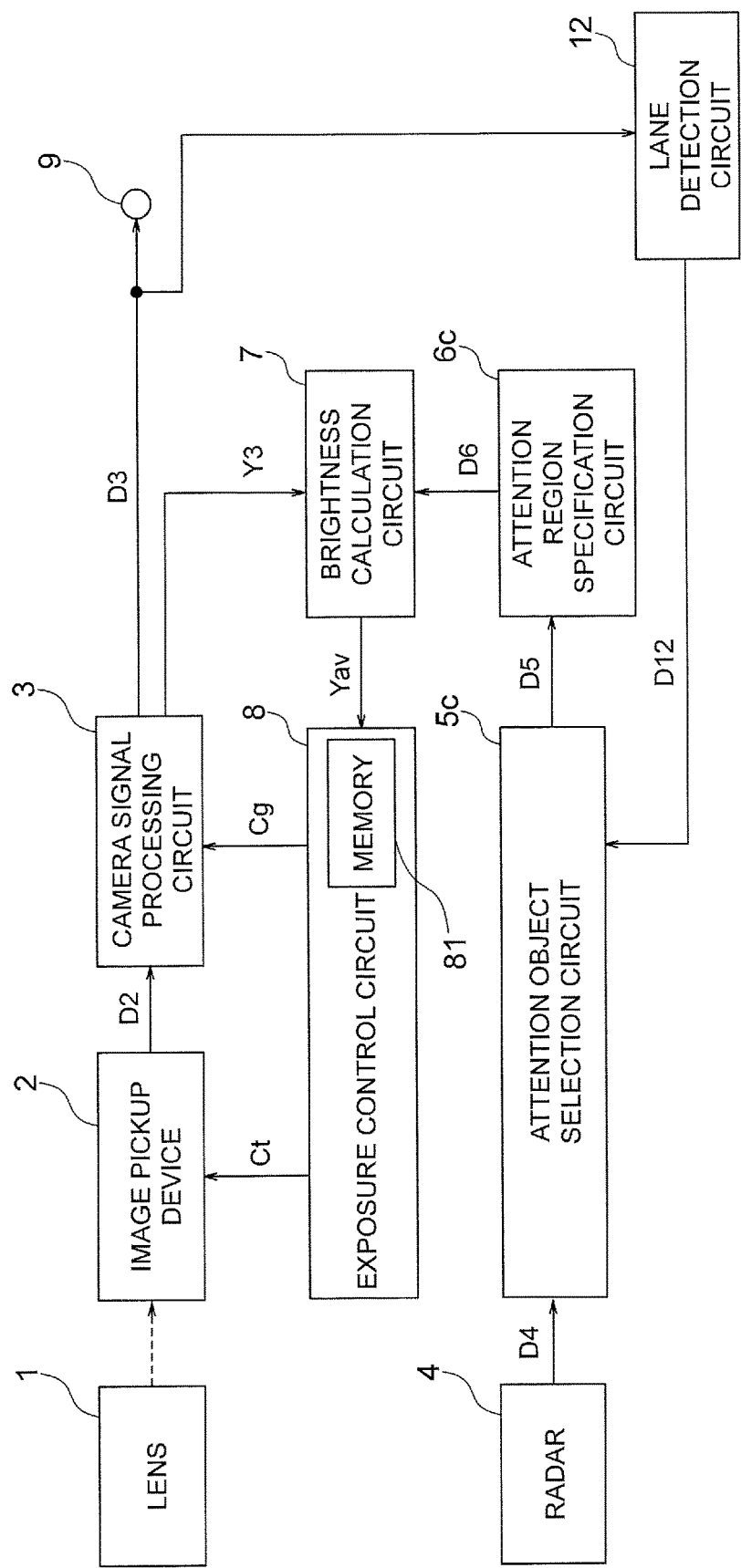
FIG. 23 is a block diagram showing a configuration of an image capturing device according to a fifth embodiment of the present invention.

FIG. 23 is a block diagram showing a configuration of an image capturing device according to a fifth embodiment of the present invention. The image capturing device of FIG. 23 is roughly equivalent to the image capturing device of FIG. 1, but an attention object selection circuit 5c is provided instead of the attention object selection circuit 5 and a lane detection circuit 12 is newly added.

The lane detection circuit 12 receives the captured image or an image signal obtained by processing the captured image, such as the image signal D3 outputted from the camera signal processing circuit 3, detects the positions of the lane markings and the median in the captured image represented by the image signal D3, and outputs information representing the detected positions of the lane markings and the median.

The attention object selection circuit 5c is roughly equivalent to the attention object selection circuit 5 in FIG. 1, but differs in the following points:

The attention object selection circuit 5c evaluates the attention degree of each object based on information D12 representing the positions of the lane markings and the median supplied from the lane detection circuit 12 and the position information D4 (the direction information D4a and the distance information D4b) on each object supplied from the radar 4, selects an object having a relatively high attention degree, such as an object having the highest attention degree, based on the result of the evaluation, and supplies the information D5 representing the position of the selected object to the attention region specification circuit 6.

For example, objects situated on the other side of the median are excluded from the targets of evaluation. Among objects situated on the same side of the median, objects in the same lane as the host vehicle are assigned a high lane evaluation value. Further, the distance evaluation value is increased with the decrease in the distance to each object. The attention degree is determined by totalizing the lane evaluation value and the distance evaluation value. In this case, the attention degree is increased with the increase in the lane evaluation value and increased with the increase in the distance evaluation value. Then, an object having the highest attention degree is selected.

The attention region specification circuit 6, the brightness calculation circuit 7 and the exposure control circuit 8 operate similarly to those in the first embodiment.

As above, the object selection is made exclusively from objects situated in lanes in the same traveling direction as the host vehicle by using the information representing lanes and the exposure control is performed so that an object in the same lane and having high possibility of rear-end collision is optimally exposed, and thus the images can be prevented from darkening under the influence of headlights of vehicles traveling in opposite lanes, which is advantageous for the prevention of rear-end collisions.

Sixth Embodiment

In the example regarding the first embodiment explained referring to FIGS. 6 and 7, only an object having the highest attention degree is selected, a region including the selected object is specified as the attention region, and the exposure control is performed based on the luminance of the attention region. However, the number of the selected objects is not limited to one. Namely, it is also possible to select a plurality of objects, specify a plurality of regions each including one of the selected object as attention regions, and perform the exposure control based on the luminance of the plurality of attention regions.

Figure 24:
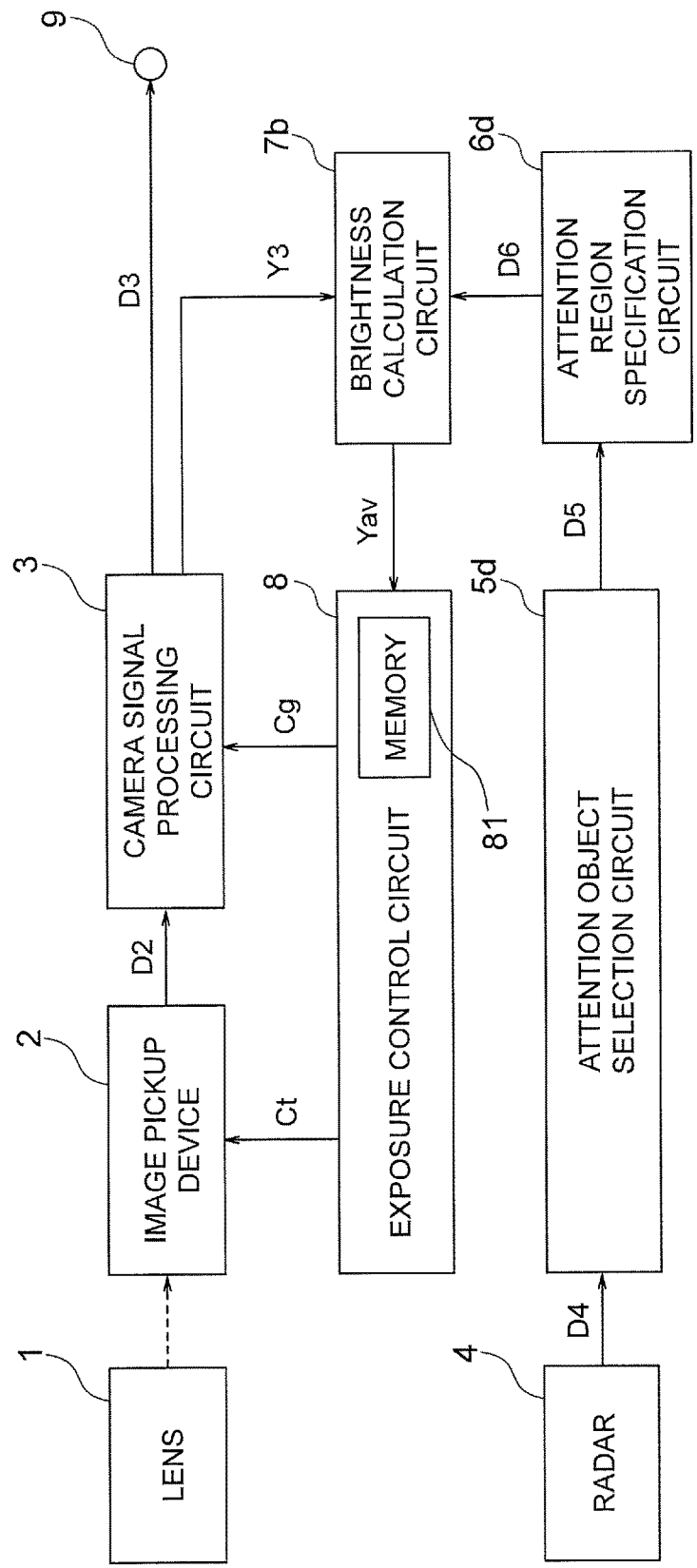
FIG. 24 is a block diagram showing a configuration of an image capturing device according to a sixth embodiment of the present invention.

FIG. 24 shows a configuration of an image capturing device performing such exposure control.

The image capturing device of FIG. 24 is roughly equivalent to the image capturing device of FIG. 1. However, an attention object selection circuit 5d, an attention region specification circuit 6d and a brightness calculation circuit 7b are provided instead of the attention object selection circuit 5, the attention region specification circuit 6 and the brightness calculation circuit 7.

In such a configuration, the attention object selection circuit 5d selects a plurality of objects and outputs information representing the positions of the selected objects. For example, an object having the highest attention degree and an object having the second highest attention degree are selected. In the case where the attention degree is increased with the decrease in the distance, an object at the shortest distance and an object at the second shortest distance are selected. In the example of FIG. 5, the object D and the object B are selected.

Figure 25:
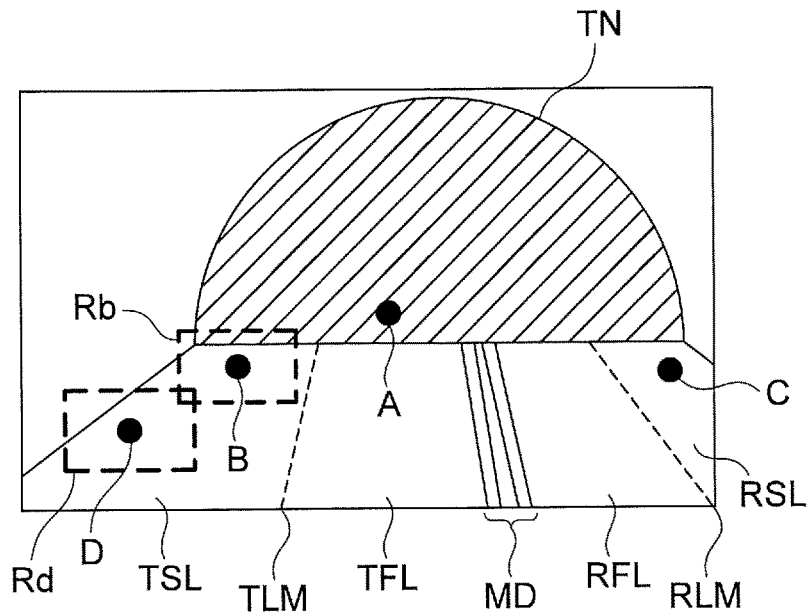
FIG. 25 is a diagram showing an example of attention regions specified for two objects selected from the objects shown in FIG. 5 based on the distance.

The attention region specification circuit 6d specifies regions, each centering at the center of one of the plurality of objects selected by the attention object selection circuit 5d and having a size determined according to the distance to the object, as the attention regions. For example, a region including the object D and a region including the object B are specified as shown in FIG. 25. The size of the region Rb including the object B is also the size of the image part corresponding to the object B on the assumption that a large-sized vehicle exists at the distance of the object B. The region Rb including the object B is smaller than the region Rd including the object D. This is because the distance to the object B is greater than the distance to the object D.

The brightness calculation circuit 7b calculates the luminance average value Yav by performing the detection on the luminance signal Y3 outputted from the camera signal processing circuit 3 by using a region obtained by combining the attention regions Rb and Rd together as a single detection frame, and supplies the result of the calculation to the exposure control circuit 8. In other words, one luminance average value Yav is determined for the attention regions Rb and Rd as one brightness index value.

The exposure control circuit 8 performs the exposure control based on the luminance average value Yav.

As a result, an image in which the brightness has been optimally controlled in the attention regions Rb and Rd is obtained. Specifically, an image with high visibility of the objects B and D in the attention regions Rb and Rd, with no blown out highlights in the image parts in the attention regions Rb and Rd, is obtained.

Figure 26:
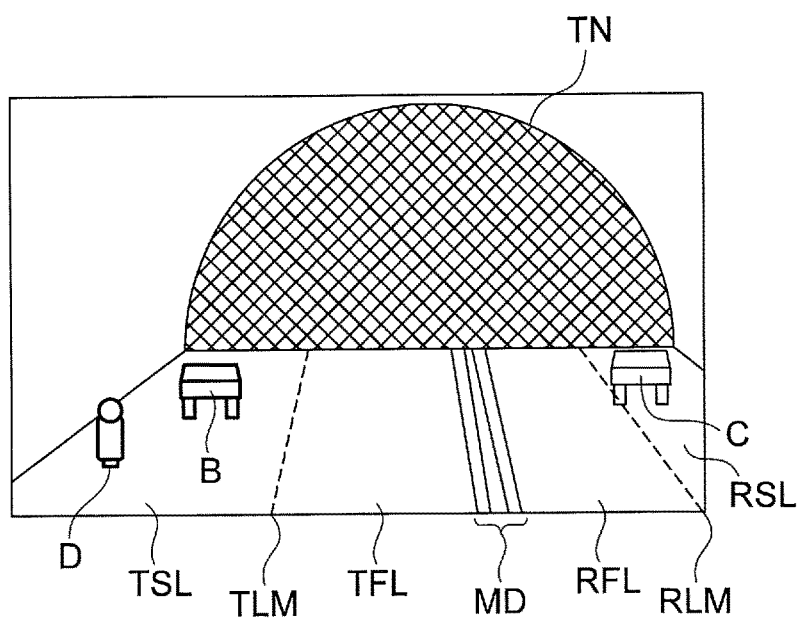
FIG. 26 is a diagram showing an example of an image obtained as the result of exposure control performed by using the attention regions of FIG. 25 as the detection frame.

For example, as shown in FIG. 26, even though the inside of the tunnel TN is blocked up to black, an image with appropriate brightness control of the outside of the tunnel TN, especially the attention regions Rb and Rd and accordingly the objects B and D situated therein, and with high visibility of the objects B and D is obtained.

The sixth embodiment has been described above as a modification to the first embodiment.

A similar modification can be made also to the second to fifth embodiments.

Seventh Embodiment

When a plurality of objects are selected and a plurality of regions corresponding to the selected objects are specified as the attention regions in the sixth embodiment, the plurality of attention regions are integrated into a single detection frame, the luminance average value regarding the detection frame is determined, and the exposure control is performed based on the determined luminance average value. Instead, it is also possible to specify attention regions different from each other in different frame periods of the image capturing by the image pickup device 2, determine the luminance average value by using a specified attention region as the detection frame, and employ an exposure condition, specified based on the determined luminance average value, for later image capturing in a frame period in which the same attention region is specified. The following explanation will be given assuming that the number of the selected objects is M (M is an integer larger than or equal to 2) and thus the number of the attention regions is M. In this case, the image capturing device operates by using M frame periods as one operation period or operation cycle.

Figure 27:
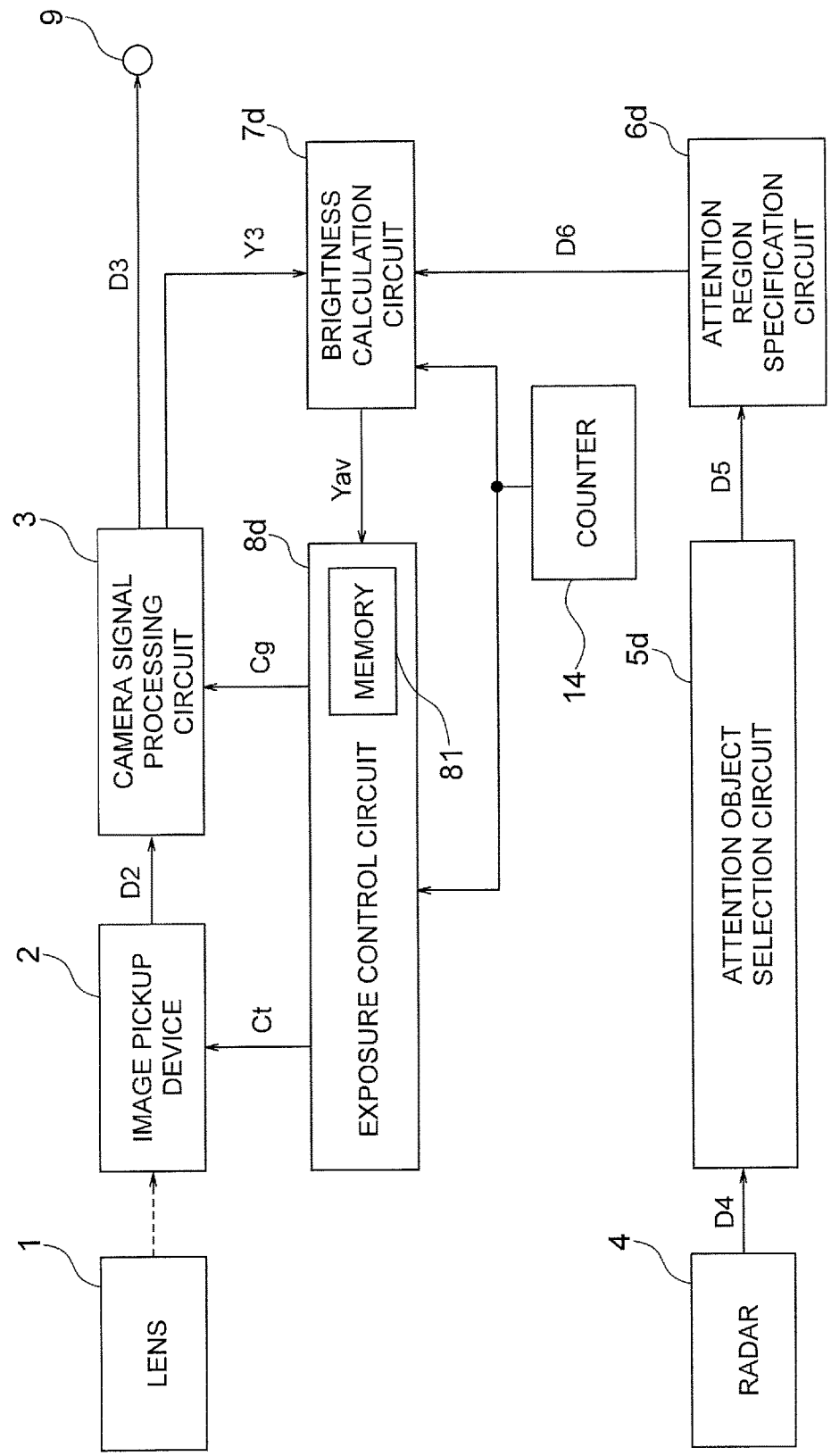
FIG. 27 is a block diagram showing a configuration of an image capturing device according to a seventh embodiment of the present invention.

FIG. 27 shows an image capturing device employed in this case. The image capturing device of FIG. 27 is roughly equivalent to the image capturing device of FIG. 24, but a brightness calculation circuit 7d and an exposure control circuit 8d are provided instead of the brightness calculation circuit 7b and the exposure control circuit 8 and a counter 14 is added.

The counter 14, having a maximum value M equal to the number of frame periods constituting one operation period, has its count value m incremented by 1 every frame period and returned to an initial value 1 when the count value m reaches the aforementioned maximum value M, and repeats the count.

The count value m of the counter 14 is supplied to the brightness calculation circuit 7d and the exposure control circuit 8d.

The attention object selection circuit 5d selects M objects and outputs information representing the positions of the selected objects. For example, objects of the highest attention degree to the M-th highest attention degree are selected. In cases where M equals 2 and the attention degree is increased with the decrease in the distance, an object at the shortest distance and an object at the second shortest distance are selected. In the example of FIG. 5, the object D and the object B are selected.

The attention object selection circuit 5d supplies information D5 representing the position of each of the selected M objects to the attention region specification circuit 6d.

The attention region specification circuit 6d specifies the attention region for each of the M objects selected by the attention object selection circuit 5d. For example, in cases where M equals 2 and the object D and the object B shown in FIG. 5 have been selected, a region including the object D and a region including the object B are specified as shown in FIG. 25.

The attention region specification circuit 6d supplies the attention region information D6 on each of the specified M attention regions to the brightness calculation circuit 7d.

The brightness calculation circuit 7d specifies one of the M attention regions in each frame period and calculates the luminance average value Yav by performing the detection on the luminance signal Y3 outputted from the camera signal processing circuit 3 by using the specified attention region as the detection frame.

Specifically, for a captured image obtained in the m-th frame period in one operation period, the luminance average value Yavm is calculated by using the m-th attention region as the detection frame.

The fact that the captured image as the target of processing is the captured image obtained in the m-th frame period in one operation period can be confirmed from the counter 14's count value being m.

In cases where M equals 2 and the attention regions Rb and Rd have been specified, for example, the luminance average value Yav1 or Yav2 of the attention region Rb or Rd is calculated by alternately using the attention regions Rb and Rd, that is, by using each of the attention regions Rb and Rd every other frame period.

The brightness calculation circuit 7d supplies the result Yavm of the above calculation to the exposure control circuit 8d.

The memory 81 of the exposure control circuit 8d stores exposure condition parameters corresponding to the M attention regions R1-RM, namely, values (parameters) Te1-TeM of the exposure time Te and values (parameters) Gs1-GsM of the signal amplification gain Gs.

In each frame period, the exposure control circuit 8d performs the exposure control based on the luminance average value calculated by using one of the M attention regions as the detection frame.

Specifically, in the image capturing in the m-th frame period in one operation period, the exposure control on the image pickup device 2 and the camera signal processing circuit 3 is performed by using the exposure condition parameters Tem and Gsm stored in the memory 81.

For the captured image obtained in the m-th frame period in one operation period, the brightness calculation circuit 7d calculates the luminance average value Yavm by using the m-th attention region of the captured image as the detection frame, and thus the exposure control circuit 8d calculates new parameters Tem and Gsm (updates the parameters) based on the calculated luminance average value Yavm and the exposure condition parameters Tem and Gsm stored in the memory 81 and stores the calculated new parameters (updated parameters) Tem and Gsm in the memory 81.

The updated parameters Tem and Gsm stored in the memory 81 will be used for the exposure control in the image capturing in the m-th frame period in the next operation period.

The fact that the captured image as the target of processing is a captured image obtained in the m-th frame period in one operation period can be confirmed from the counter 14's count value being m.

As above, a plurality of attention regions are successively selected respectively for frame periods, the luminance average value is determined by using the selected attention region as the detection frame, the new exposure condition parameters corresponding to the selected attention region are calculated based on the determined luminance average value, and the exposure control is performed by using the calculated parameters in a frame period in which the same attention region is selected in the next operation period. Therefore, for the captured image of each frame, an image with high visibility of the selected attention region can be obtained.

For example, in cases where M equals 2 and the attention regions are Rb and Rd, an image with high visibility of the attention region Rb is obtained in a frame period and an image with high visibility of the attention region Rd is obtained in the next frame period.

In the above-described example, the number of selected objects and the number of frame periods constituting one operation period are both M, the same as each other, and the exposure control based on the luminance average value of the attention region corresponding to each object is performed at the same frequency. However, the present invention is not limited to this example. For example, the exposure control based on the luminance average value of the attention region corresponding to each object may be performed at different frequencies.

For example, it is possible to set the number (Mf) of frame periods constituting one operation period larger than the number (Mo) of selected objects and perform the exposure control based on the luminance average value of the attention region corresponding to an object in two or more frame periods in one operation period in regard to some of the selected objects. In short, it is desirable if the exposure condition parameters are updated based on the luminance average value of a certain attention region in the captured image of a certain frame period and the updated parameters are used in the image capturing in a frame period in which the luminance average value of the same attention region is determined next.

The seventh embodiment has been described above as a modification to the first embodiment. A similar modification can be made also to the second to fifth embodiments.

While the third to seventh embodiments have been described by using the operation in the vicinity of the entrance of a tunnel as an example, similar effects can be obtained also in the vicinity of the exit of a tunnel similarly to the explanation in the first and second embodiments.

While the first to seventh embodiments have been described on the assumption that the detection range of the radar 4 is identical with the imaging field angle range of the image pickup device 2, this condition is not essential; it is permissible if these ranges at least partially overlap each other.

While the detection by the radar 4 is carried out in sync with the image capturing by the image pickup device 2 in the first to seventh embodiments, this condition is not essential.

In cases where the detection by the radar 4 and the image capturing by the image pickup device 2 are not in sync with each other, it is possible to interpolate either of the position information obtained as the result of the detection by the radar 4 and the captured image obtained by the image pickup device 2 in the temporal direction and thereby generate information and an image at the same timing. For example, it is possible to interpolate the position information obtained by the radar 4 and thereby generate position information at the same timing as the image capturing by the image pickup device 2. Conversely, it is also possible to interpolate the captured image obtained by the image pickup device 2 and thereby generate an image at the same timing as the detection by the radar 4. The interpolation mentioned here includes interpolation of the type directly using the position information or captured image obtained at the nearest time as the interpolated position information or image.

While the present invention has been described above as image capturing devices, image capturing methods executed by the above-described image capturing devices also constitute a part of the present invention.

In the first to seventh embodiments described above, at least part of the component parts of the image capturing device is implemented by a processing circuit. The processing circuit may either be dedicated hardware or a CPU executing a program stored in a memory.

For example, the functions of the parts shown in FIG. 1, FIG. 17, FIG. 23, FIG. 24 or FIG. 27 other than the lens 1, the image pickup device 2 or the radar 4 may either be implemented respectively by separate processing circuits or all together by one processing circuit. Similarly, the functions of the parts shown in FIG. 12 or FIG. 20 other than the lens 1, the image pickup device 2, the radar 4 and the traveling direction detection circuit 10 may either be implemented respectively by separate processing circuits or all together by one processing circuit.

In cases where the processing circuit is a CPU, the function of each part of the image capturing device is implemented by software, firmware, or a combination of software and firmware. The software or firmware is described as a program and stored in a memory. The processing circuit implements the function of each part by reading out a program stored in the memory and executing the program. Thus, the image capturing device includes a memory for storing programs to consequently cause the execution of the functions of the parts shown in FIG. 1, FIG. 12, FIG. 17, FIG. 20, FIG. 23, FIG. 24 or FIG. 27 other than the lens 1, the image pickup device 2, the radar 4 and the traveling direction detection circuit 10 when the programs are executed by the processing circuit(s). These programs can be described as programs for causing a computer to execute the method of the processing in the image capturing method executed by the image capturing device or the procedure thereof.

It is also possible to implement the functions of the parts of the image capturing device partially by dedicated hardware and partially by software or firmware.

As above, the processing circuit(s) can implement the aforementioned functions by hardware, software, firmware, or a combination of some of these.

FIG. 28 shows an example of a configuration in a case where all the functions of the image capturing device shown in FIG. 1, FIG. 17, FIG. 23, FIG. 24 or FIG. 27 other than the lens 1, the image pickup device 2 and the radar 4 are implemented by a computer including a single CPU, wherein the lens 1, the image pickup device 2 and the radar 4 are also shown together with the configuration example. The image capturing device is formed of the computer 50, the lens 1, the image pickup device 2 and the radar 4.

The computer shown in FIG. 28 includes a CPU 51, a memory 52, a first input interface 53A, a second input interface 53B, a first output interface 54A and a second output interface 54B, which are connected together by a bus 55.

The CPU 51 operates according to a program stored in the memory 52. Specifically, the CPU 51 performs the same processing as the camera signal processing circuit 3 on the imaging signal D2 inputted via the first input interface 53A and outputs the image signal D3 obtained as the result of the processing from the second output interface 54B. Further, the CPU 51 performs the same processing as the attention object selection circuit 5, the attention region specification circuit 6, the brightness calculation circuit 7 or 7b and the exposure control circuit 8 or 8b on the imaging signal D2 inputted via the first input interface 53A and the position information D4 from the radar 4 inputted via the second input interface 53B and supplies a control signal Ct for controlling the exposure time obtained as the result of the processing to the image pickup device 2 via the first output interface 54A.

FIG. 29 shows an example of a configuration in a case where all the functions of the image capturing device shown in FIG. 12 or FIG. 20 other than the lens 1, the image pickup device 2, the radar 4 and the traveling direction detection circuit 10 are implemented by a computer including a single CPU, wherein the lens 1, the image pickup device 2, the radar 4 and the traveling direction detection circuit 10 are also shown together with the configuration example. The image capturing device is formed of the computer 50, the lens 1, the image pickup device 2, the radar 4 and the traveling direction detection circuit 10.

In the case of the embodiment shown in FIG. 12 or FIG. 20, the computer includes a third input interface 53C as shown in FIG. 29 in addition to the configuration of FIG. 28, and the information D10 representing the traveling direction supplied from the traveling direction detection circuit 10 is inputted via the third input interface 53C.

The CPU 51 in FIG. 29 uses not only the imaging signal D2 inputted via the first input interface 53A and the position information D4 from the radar 4 inputted via the second input interface 53B but also the information D10 representing the traveling direction inputted from the traveling direction detection circuit 10 via the third input interface 53c, performs the same processing as the attention object selection circuit 5, the attention region specification circuit 6, the brightness calculation circuit 7 or 7b and the exposure control circuit 8 or 8b on the imaging signal D2, the position information D4 and the information D10, and supplies the control signal Ct for controlling the exposure time obtained as the result of the processing to the image pickup device 2 via the first output interface 54A.

Incidentally, the traveling direction detection circuit 10 is a circuit for detecting the traveling direction of the host vehicle based on the steering direction of the steering wheel of the host vehicle and outputting the information D10 representing the traveling direction, and it is also possible to form part of the traveling direction detection circuit 10 by a processing circuit. In cases where the traveling direction detection circuit 10 is a circuit for detecting the traveling direction based on information generated inside the CPU 51, it is also possible to form the whole of the traveling direction detection circuit 10 by a processing circuit.

Effects similar to those described in regard to the image capturing device are achieved also by a program for causing a computer to execute the image capturing method executed by the image capturing device, the processes of the parts of the image capturing device, or the processes in the image capturing method.

DESCRIPTION OF REFERENCE CHARACTERS

1: lens, 2: image pickup device, 3: camera signal processing circuit 3, 4: radar, 5, 5b, 5c, 5d: attention object selection circuit, 6, 6c, 6d: attention region specification circuit, 7, 7b, 7d: brightness calculation circuit, 8, 8d: exposure control circuit, 9: output terminal, 10: traveling direction detection circuit, 11: attention object judgment circuit, 12: lane detection circuit, 41: transmission unit, 42: antenna, 43: reception unit, 50: computer, 51: CPU, 52: memory.

What is claimed is:

1. An image capturing device comprising:
a camera configured to capture an image of a subject situated in an imaging field angle range and thereby generates a captured image;
a radar configured to detect objects existing in a detection range at least partially overlapping the imaging field angle range and produce information representing a position of each of the detected objects, information representing a direction of each of the detected objects and information representing a distance to each of the detected objects;
a computer processor; and
a memory storing instructions which, when executed, causes the computer processor to perform a process of evaluating an attention degree of each of the detected objects based on at least one of the information representing the position of each of the detected objects, the information representing the distance to each of the detected objects, and the information representing the direction of each of the detected objects, which are produced by the radar, and selecting one or more objects based on the attention degree;
specifying one or more regions in the captured image respectively including the selected objects as attention regions based on the attention degree, said specified attention regions excluding each detected object not selected;
calculating a brightness of the captured image in the specified attention regions; and
performing exposure control on the camera based on the calculated brightness,
wherein:
the process selects a plurality of objects based on the information representing the direction of the object and the information representing the distance,
the process specifies the attention region for each of the plurality of objects selected,
the camera captures video of the subject and outputs the captured image every frame period,
the process calculates the brightness in each frame period by using one of the plurality of attention regions respectively specified for the plurality of objects as a detection frame, and
the process adjusts an exposure condition in a certain frame period based on the brightness calculated by using one of the plurality of attention regions as the detection frame and uses the adjusted exposure condition later in the image capturing in a frame period in which the brightness is calculated by using the same attention region as the detection frame.

2. The image capturing device according to claim 1, wherein the process evaluates an attention degree of the object higher with the decrease in the distance to the object represented by the information representing the distance regarding each detected object outputted from the radar and makes the object selection based on the attention degree.

3. The image capturing device according to claim 1, wherein:
the camera is mounted on a vehicle, and
the process further comprises detecting a traveling direction of the vehicle from a steering direction of a steering wheel, and producing information representing the traveling direction, and
the process makes the object selection based on the information representing the traveling direction and the information representing the direction of the object and the information representing the distance to the object.

4. The image capturing device according to claim 3, wherein the process evaluates an attention degree of the object higher as the direction of the object represented by the information representing the direction regarding the object becomes closer to the traveling direction, and makes the object selection based on the attention degree.

5. The image capturing device according to claim 1, wherein the process specifies a region in the captured image including a part estimated to be occupied by the selected object in a case where the object is assumed to be of the largest type among a presumed plurality of types of objects as the attention region.

6. The image capturing device according to claim 1, wherein the process calculates the brightness by using the plurality of attention regions respectively specified for the plurality of objects as a single detection frame.

7. The image capturing device according to claim 1, wherein the process further comprises judging a type of the selected object based on the captured image,
wherein the process determines the attention region based on the judged type of the selected object.

8. The image capturing device according to claim 7, wherein the process judges the type of the selected object by analyzing a part in the captured image that is estimated to be occupied by the selected object in a case where the selected object is assumed to be of the largest type among a presumed plurality of types of objects.

9. An image capturing device comprising:
a camera configured to capture an image of a subject situated in an imaging field angle range and thereby generates a captured image;
a radar configured to detect an object existing in a detection range at least partially overlapping the imaging field angle range and produce information representing a direction of the object and information representing a distance to the object;
a computer processor; and
a memory storing instructions which, when executed, causes the computer processor to perform a process of selecting one or more objects based on the information representing the direction of the object and the information representing the distance to the object which are produced by the radar, and producing information representing a position of the selected object in the captured image and information representing the distance to the selected object;
specifying a region in the captured image including the selected object as an attention region based on the information representing the position of the selected object and the information representing the distance to the selected object;

calculating brightness of the captured image in the specified attention region; and performing exposure control on the camera based on the calculated brightness, wherein:

the camera is mounted on a vehicle, the process further comprises detecting a position of a lane marking and a median in the captured image based on the captured image, and producing information representing the detected position of the lane marking and the median, and the process makes the object selection based on the information representing the position of the lane marking and the median and the information representing the direction of the object and the information representing the distance.

10. An image capturing method in an image capturing device, the image capturing device including:

a camera configured to capture an image of a subject situated in an imaging field angle range and thereby generates a captured image; and a radar configured to detect objects existing in a detection range at least partially overlapping the imaging field angle range, and produce information representing a position of each of the detected objects, information representing a direction of each of the detected objects and information representing a distance to each of the detected objects, the method comprising:

evaluating an attention degree of each of the detected objects based on at least one of the information representing a position of each of the detected objects, the information representing the distance to each of the detected objects, and the information representing the direction of each of the detected objects, which are produced by the radar, and selecting one or more objects based on the attention degree;

specifying one or more regions in the captured image respectively including the selected objects as attention regions based on the attention degree, said specified attention regions excluding each detected object not selected;

calculating a brightness of the captured image in the specified attention regions; and performing exposure control on the camera based on the calculated brightness, wherein:

the method selects a plurality of objects based on the information representing the direction of the object and the information representing the distance, the method specifies the attention region for each of the plurality of objects selected, the camera captures video of the subject and outputs the captured image every frame period, the method calculates the brightness in each frame period by using one of the plurality of attention regions respectively specified for the plurality of objects as a detection frame, and the method adjusts an exposure condition in a certain frame period based on the brightness calculated by using one of the plurality of attention regions as the detection frame and uses the adjusted exposure condition later in the image capturing in a frame period in which the brightness is calculated by using the same attention region as the detection frame.

11. A non-transitory computer-readable record medium storing a program for causing a computer to execute the image capturing method according to claim 10.

* * * * *